US012165660B2

(12) United States Patent
Wang et al.

(10) Patent No.: US 12,165,660 B2
(45) Date of Patent: Dec. 10, 2024

(54) MULTI-CHANNEL AUDIO SIGNAL CODING METHOD AND APPARATUS

(71) Applicant: Huawei Technologies Co., Ltd., Shenzhen (CN)

(72) Inventors: Zhi Wang, Beijing (CN); Jiance Ding, Beijing (CN); Bin Wang, Shenzhen (CN); Zhe Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 71 days.

(21) Appl. No.: 18/154,486

(22) Filed: Jan. 13, 2023

(65) Prior Publication Data

US 2023/0186924 A1 Jun. 15, 2023

Related U.S. Application Data

(63) Continuation of application No. PCT/CN2021/106826, filed on Jul. 16, 2021.

(30) Foreign Application Priority Data

Jul. 17, 2020 (CN) ........................ 202010728902.2

(51) Int. Cl.

*G10L 19/008* (2013.01)
*G10L 19/002* (2013.01)
*G10L 25/21* (2013.01)

(52) U.S. Cl.

CPC .......... *G10L 19/008* (2013.01); *G10L 19/002* (2013.01); *G10L 25/21* (2013.01)

(58) Field of Classification Search

CPC .................................................... G10L 19/008
See application file for complete search history.

(56) References Cited

U.S. PATENT DOCUMENTS

2006/0115100 A1* 6/2006 Faller .................... G10L 19/008 381/119
2011/0081032 A1* 4/2011 Soulodre .................. H04R 5/02 381/300

(Continued)

FOREIGN PATENT DOCUMENTS

CN 101695150 B 11/2011
CN 106710600 A 5/2017

(Continued)

*Primary Examiner* — Feng-Tzer Tzeng
(74) *Attorney, Agent, or Firm* — Conley Rose, P.C.

(57) ABSTRACT

A multi-channel audio signal coding method includes obtaining a to-be-encoded first audio frame, pairing at least five channel signals according to a first pairing manner to obtain a first channel pair set, obtaining a first sum of correlation values of the first channel pair set, where one channel pair has one correlation value, pairing the at least five channel signals according to a second pairing manner to obtain a second channel pair set, obtaining a second sum of correlation values of the second channel pair set, determining a target pairing manner of the at least five channel signals based on the first sum of correlation values and the second sum of correlation values, and encoding the at least five channel signals based on a channel pair set corresponding to the target pairing manner, where the target pairing manner is the first pairing manner or the second pairing manner.

21 Claims, 8 Drawing Sheets

(56) References Cited

U.S. PATENT DOCUMENTS

| | | | | |
|---|---|---|---|---|
| 2012/0020481 | A1* | 1/2012 | Usami | H04R 5/02 381/300 |
| 2015/0010155 | A1 | 1/2015 | Virette et al. | |
| 2016/0217797 | A1 | 7/2016 | Kjoerling et al. | |
| 2018/0090151 | A1 | 3/2018 | Dick et al. | |
| 2019/0005969 | A1 | 1/2019 | Dick et al. | |

FOREIGN PATENT DOCUMENTS

| | | | |
|---|---|---|---|
| JP | 2015011076 | A | 1/2015 |
| JP | 5947971 | B2 | 7/2016 |
| JP | 2016535316 | A | 11/2016 |
| JP | 2018513402 | A | 5/2018 |
| KR | 100917845 | B1 | 9/2009 |
| WO | 2020007719 | A1 | 1/2020 |

* cited by examiner

MULTI-CHANNEL AUDIO SIGNAL CODING METHOD AND APPARATUS

CROSS-REFERENCE TO RELATED APPLICATIONS

This is a U.S. continuation of International Patent Application No. PCT/CN2021/106826 filed on Jul. 16, 2021, which claims priority to Chinese Patent Application No. 202010728902.2 filed on Jul. 17, 2020. The disclosures of the aforementioned applications are hereby incorporated by reference in their entireties.

TECHNICAL FIELD

This disclosure relates to audio processing technologies, and in particular, to a multi-channel audio signal coding method and apparatus.

BACKGROUND

Multi-channel audio encoding and decoding is a technology of encoding or decoding audio with at least two channels. Common multi-channel audio includes 5.1-channel audio, 7.1-channel audio, 7.1.4-channel audio, and 22.2-channel audio.

A Moving Picture Experts Group (MPEG) Surround (MPS) standard specifies joint coding on four channels, but still requires encoding and decoding methods for the foregoing multi-channel audio signals.

SUMMARY

This disclosure provides a multi-channel audio signal coding method and apparatus to make an audio frame coding more diversified and efficient.

According to a first aspect, this disclosure provides a multi-channel audio signal coding method, including: obtaining a to-be-encoded first audio frame, where the first audio frame includes at least five channel signals; pairing the at least five channel signals according to a first pairing manner to obtain a first channel pair set, where the first channel pair set includes at least one channel pair, and one channel pair includes two channel signals of the at least five channel signals; obtaining a first sum of correlation values of the first channel pair set, where one channel pair has one correlation value, and the correlation value indicates correlation between two channel signals of the channel pair; pairing the at least five channel signals according to a second pairing manner to obtain a second channel pair set; obtaining a second sum of correlation values of the second channel pair set; determining a target pairing manner of the at least five channel signals based on the first sum of correlation values and the second sum of correlation values; and encoding the at least five channel signals according to the target pairing manner, where the target pairing manner is the first pairing manner or the second pairing manner.

The first audio frame in this embodiment may be any frame of to-be-encoded multi-channel audio, and the first audio frame includes five or more channel signals. Encoding two highly correlated channel signals together can reduce redundancy and improve coding efficiency. Therefore, in this embodiment, pairing is performed based on a correlation value between two channel signals. To find a pairing manner with highest correlation as much as possible, correlation values between every two of the at least five channel signals in the first audio frame may be calculated to obtain a correlation value set of the first audio frame. The first pairing manner includes: selecting a channel pair from channel pairs corresponding to the at least five channel signals, and adding the channel pair to the first channel pair set, to obtain a largest sum of correlation values. The first sum of correlation values is a sum of correlation values of all channel pairs in the first channel pair set corresponding to the first pairing manner. The second pairing manner includes: first adding, to the second channel pair set, a channel pair with a largest correlation value in the channel pairs corresponding to the at least five channel signals; and adding, to the second channel pair set, a channel pair with a largest correlation value in other channel pairs other than an associated channel pair in the channel pairs corresponding to the at least five channel signals, where the associated channel pair includes any channel signal included in a channel pair added to the first channel pair set. The second sum of correlation values is a sum of correlation values of all channel pairs in the second channel pair set corresponding to the second pairing manner.

In this embodiment, two pairing manners are combined, to determine, based on a sum of correlation values corresponding to a pairing manner, whether to use a pairing manner in a conventional technology or use a pairing manner for obtaining a largest sum of correlation values, making an audio frame coding method more diversified and efficient.

In a possible implementation, the determining a target pairing manner of the at least five channel signals based on the first sum of correlation values and the second sum of correlation values includes: when the first sum of correlation values is greater than the second sum of correlation values, determining that the target pairing manner is the first pairing manner; or when the first sum of correlation values is equal to the second sum of correlation values, determining that the target pairing manner is the second pairing manner.

Initially, the target pairing manner is determined based on the sum of correlation values, so that a sum of correlation values of all channel pairs included in a target channel pair set can be as large as possible, and a quantity of channel pairs that are paired can be increased as much as possible, reducing redundancy between channel signals.

In a possible implementation, before the encoding the at least five channel signals according to the target pairing manner, the method further includes: obtaining a fluctuation interval value of the at least five channel signals; when the target pairing manner is the first pairing manner, determining an energy equalization mode based on the fluctuation interval value of the at least five channel signals; or when the target pairing manner is the second pairing manner, determining an energy equalization mode based on the fluctuation interval value of the at least five channel signals, and re-determining the target pairing manner of the at least five channel signals; and separately performing energy equalization processing on the at least five channel signals according to the energy equalization mode to obtain at least five equalized channel signals. Correspondingly, the encoding the at least five channel signals according to the target pairing manner includes: encoding the at least five equalized channel signals according to the target pairing manner.

In this embodiment of this disclosure, the foregoing energy equalization may also be amplitude equalization, an object of energy equalization processing is energy, and an object of amplitude equalization processing is amplitude. A square relationship exists between energy of a channel signal and amplitude of the channel signal, that is, energy=amplitude$^2$=amplitude×amplitude.

A first energy equalization mode is a pair energy equalization mode. In this mode, for any channel pair, only two channel signals of the channel pair are used to obtain two equalized channel signals corresponding to the channel pair. It should be noted that, "only" means that, when an equalized channel signal is obtained, a channel pair is used as a unit, and energy equalization processing is performed only based on two channel signals included in the channel pair. Two obtained equalized channel signals relate only to the two channel signals, without performing energy equalization on other channel signals not in the channel pair. However, "only" is not used to limit information content in the energy equalization processing. For example, reference may be made to a related feature parameter, an encoding/decoding parameter, and the like of the channel signal during the energy equalization processing. This is not specifically limited herein. A second energy equalization mode is an overall energy equalization mode. In this mode, two channel signals in one channel pair and at least one channel signal not in the one channel pair are used to obtain two equalized channel signals corresponding to the one channel pair. It should be noted that another energy equalization mode may further be used in this disclosure. This is not specifically limited herein.

When it is initially determined that the first pairing manner is used, an energy equalization mode may be further determined based on the fluctuation interval value of the at least five channel signals. When it is initially determined that the second pairing manner is used, an energy equalization mode may be further determined based on the fluctuation interval value of the at least five channel signals, and the target pairing manner of the at least five channel signals may be re-determined, so that the pairing manner can be determined from multiple dimensions, and energy equalization more adapts to a feature of the multi-channel signal, making an audio frame coding method more diversified and efficient.

In a possible implementation, the determining an energy equalization mode based on the fluctuation interval value of the at least five channel signals includes: when the fluctuation interval value meets a preset condition, determining that the energy equalization mode is the first energy equalization mode; or when the fluctuation interval value does not meet the preset condition, determining that the energy equalization mode is the second energy equalization mode.

In a possible implementation, the determining an energy equalization mode based on the fluctuation interval value of the at least five channel signals, and re-determining the target pairing manner of the at least five channel signals includes: when the fluctuation interval value meets the preset condition, determining that the target pairing manner is the first pairing manner, and the energy equalization mode is the first energy equalization mode; or when the fluctuation interval value does not meet the preset condition, determining that the target pairing manner is the second pairing manner, and the energy equalization mode is the second energy equalization mode.

In a possible implementation, before the determining an energy equalization mode based on the fluctuation interval value of the at least five channel signals, the method further includes: determining whether a coding bit rate corresponding to the first audio frame is greater than a bit rate threshold. Optionally, in an implementation, the bit rate threshold may set to 28 kbps/(a quantity of effective channel signals/a frame rate), where 28 kbps may alternatively be another empirical value, for example, 30 kbps or 26 kbps. The effective channel signal refers to another channel signal other than LFE. For example, a channel signal other than LFE in the 5.1 channel includes C, L, R, LS, and RS, and a channel signal other than LFE in the 7.1 channel includes C, L, R, LS, RS, LB, and RB. When the coding bit rate is greater than the bit rate threshold, it is determined that the energy equalization mode is the second energy equalization mode. When the coding bit rate is less than or equal to the bit rate threshold, the energy equalization mode is determined based on the fluctuation interval value. The frame rate is a quantity of frames processed in unit time. The frame rate is calculated according to the following formula: Frame rate=Sampling rate/Quantity of samples corresponding to an audio frame. For example, if the sampling rate is 48000 Hz, the quantity of samples corresponding to an audio frame is 960, and the frame rate is 48000/960=50 (frames/s).

When the energy equalization mode is determined, a factor of the coding bit rate is added. This can improve coding efficiency.

In a possible implementation, the fluctuation interval value includes energy flatness of the first audio frame, and the fluctuation interval value meeting the preset condition indicates that the energy flatness is less than a first threshold, for example, the first threshold may be 0.483; or the fluctuation interval value includes amplitude flatness of the first audio frame, and the fluctuation interval value meeting the preset condition indicates that the amplitude flatness is less than a second threshold, for example, the second threshold may be 0.695; or the fluctuation interval value includes energy deviation of the first audio frame, and the fluctuation interval value meeting the preset condition indicates that the energy deviation falls outside a first preset range, for example, the first preset range may be 0.04 to 25; or the fluctuation interval value includes amplitude deviation of the first audio frame, and the fluctuation interval value meeting the preset condition indicates that the amplitude deviation falls outside a second preset range, for example, the second preset range may be 0.2 to 5.

The energy equalization mode is determined based on features of a channel signal from a plurality of dimensions. This can improve accuracy of energy equalization.

In a possible implementation, the pairing the at least five channel signals according to a first pairing manner to obtain a first channel pair set includes: selecting a channel pair from channel pairs corresponding to the at least five channel signals, and adding the channel pair to the first channel pair set, to obtain a largest sum of correlation values.

In a possible implementation, the pairing the at least five channel signals according to a second pairing manner to obtain a second channel pair set includes: first adding, to the second channel pair set, a channel pair with a largest correlation value in the channel pairs corresponding to the at least five channel signals; and adding, to the second channel pair set, a channel pair with a largest correlation value in other channel pairs other than an associated channel pair in the channel pairs corresponding to the at least five channel signals, where the associated channel pair includes any channel signal included in a channel pair added to the first channel pair set.

In a possible implementation, when the energy equalization mode is the first energy equalization mode, the separately performing energy equalization processing on the at least five channel signals according to the energy equalization mode to obtain at least five equalized channel signals includes: calculating, for a current channel pair in a target channel pair set corresponding to the pairing manner, an average value of energy or amplitude values of two channel signals included in the current channel pair, and separately performing energy equalization processing on the two channel signals based on the average value to obtain two corresponding equalized channel signals.

In a possible implementation, when the energy equalization mode is the second energy equalization mode, the separately performing energy equalization processing on the at least five channel signals according to the energy equalization mode to obtain at least five equalized channel signals includes: calculating an average value of energy or amplitude values of the at least five channel signals, and separately performing energy equalization processing on the at least five channel signals based on the average value to obtain the at least five equalized channel signals.

According to a second aspect, this disclosure provides a coding apparatus, including: an obtaining module, configured to: obtaining a to-be-encoded first audio frame, where the first audio frame includes at least five channel signals; pair the at least five channel signals according to a first pairing manner to obtain a first channel pair set, where the first channel pair set includes at least one channel pair, and one channel pair includes two channel signals of the at least five channel signals; obtain a first sum of correlation values of the first channel pair set, where one channel pair has one correlation value, and the correlation value indicates correlation between two channel signals of the channel pair; pair the at least five channel signals according to a second pairing manner to obtain a second channel pair set; and obtain a second sum of correlation values of the second channel pair set; a determining module, configured to determine a target pairing manner of the at least five channel signals based on the first sum of correlation values and the second sum of correlation values; and a coding module, configured to encode the at least five channel signals according to the target pairing manner, where the target pairing manner is the first pairing manner or the second pairing manner.

In a possible implementation, the determining module is further configured to: when the first sum of correlation values is greater than the second sum of correlation values, determine that the target pairing manner is the first pairing manner; or when the first sum of correlation values is equal to the second sum of correlation values, determine that the target pairing manner is the second pairing manner.

In a possible implementation, the determining module is further configured to: obtain a fluctuation interval value of the at least five channel signals; and when the target pairing manner is the first pairing manner, determine an energy equalization mode based on the fluctuation interval value of the at least five channel signals; or when the target pairing manner is the second pairing manner, determine an energy equalization mode based on the fluctuation interval value of the at least five channel signals, and re-determine the target pairing manner of the at least five channel signals. Correspondingly, the coding module is further configured to: separately perform energy equalization processing on the at least five channel signals according to the energy equalization mode to obtain at least five equalized channel signals; and encode the at least five equalized channel signals according to the target pairing manner.

In a possible implementation, the determining module is further configured to: when the fluctuation interval value meets a preset condition, determine that the energy equalization mode is a first energy equalization mode; or when the fluctuation interval value does not meet a preset condition, determine that the energy equalization mode is a second energy equalization mode.

In a possible implementation, the determining module is further configured to: when the fluctuation interval value meets the preset condition, determine that the target pairing manner is the first pairing manner, and the energy equalization mode is the first energy equalization mode; or when the fluctuation interval value does not meet the preset condition, determine that the target pairing manner is the second pairing manner, and the energy equalization mode is the second energy equalization mode.

In a possible implementation, the determining module is further configured to: determine whether a coding bit rate corresponding to the first audio frame is greater than a bit rate threshold; and when the coding bit rate is greater than the bit rate threshold, determine that the energy equalization mode is the second energy equalization mode; or when the coding bit rate is less than or equal to the bit rate threshold, determine the energy equalization mode based on the fluctuation interval value.

In a possible implementation, the fluctuation interval value includes energy flatness of the first audio frame, and the fluctuation interval value meeting the preset condition indicates that the energy flatness is less than a first threshold; or the fluctuation interval value includes amplitude flatness of the first audio frame, and the fluctuation interval value meeting the preset condition indicates that the amplitude flatness is less than a second threshold; or the fluctuation interval value includes energy deviation of the first audio frame, and the fluctuation interval value meeting the preset condition indicates that the energy deviation falls outside a first preset range; or the fluctuation interval value includes amplitude deviation of the first audio frame, and the fluctuation interval value meeting the preset condition indicates that the amplitude deviation falls outside a second preset range.

In a possible implementation, the obtaining module is further configured to: select a channel pair from channel pairs corresponding to the at least five channel signals, and add the channel pair to the first channel pair set, to obtain a largest sum of correlation values.

In a possible implementation, the obtaining module is further configured to: first add, to the second channel pair set, a channel pair with a largest correlation value in the channel pairs corresponding to the at least five channel signals; and add, to the second channel pair set, a channel pair with a largest correlation value in other channel pairs other than an associated channel pair in the channel pairs corresponding to the at least five channel signals, where the associated channel pair includes any channel signal included in a channel pair added to the first channel pair set.

In a possible implementation, when the energy equalization mode is the first energy equalization mode, the coding module is further configured to: calculate, for a current channel pair in a target channel pair set corresponding to the pairing manner, an average value of energy or amplitude values of two channel signals included in the current channel pair; and separately perform energy equalization processing on the two channel signals based on the average value to obtain two corresponding equalized channel signals.

In a possible implementation, when the energy equalization mode is the second energy equalization mode, the coding module is further configured to: calculate an average value of energy or amplitude values of the at least five channel signals; and separately perform energy equalization processing on the at least five channel signals based on the average value to obtain the at least five equalized channel signals.

According to a third aspect, this disclosure provides a device, including: one or more processors; and a memory, configured to store one or more programs. When the one or more programs are executed by the one or more processors, the one or more processors are enabled to implement the method according to any possible implementation of the first aspect.

According to a fourth aspect, this disclosure provides a computer-readable storage medium, including a computer program. When the computer program is executed on a computer, the computer is enabled to perform the method according to any possible implementation of the first aspect.

According to a fifth aspect, an embodiment of this disclosure provides a computer-readable storage medium, including a coded bitstream obtained by using the multi-channel audio signal coding method according to any possible implementation of the first aspect.

DESCRIPTION OF EMBODIMENTS

Figure 1:
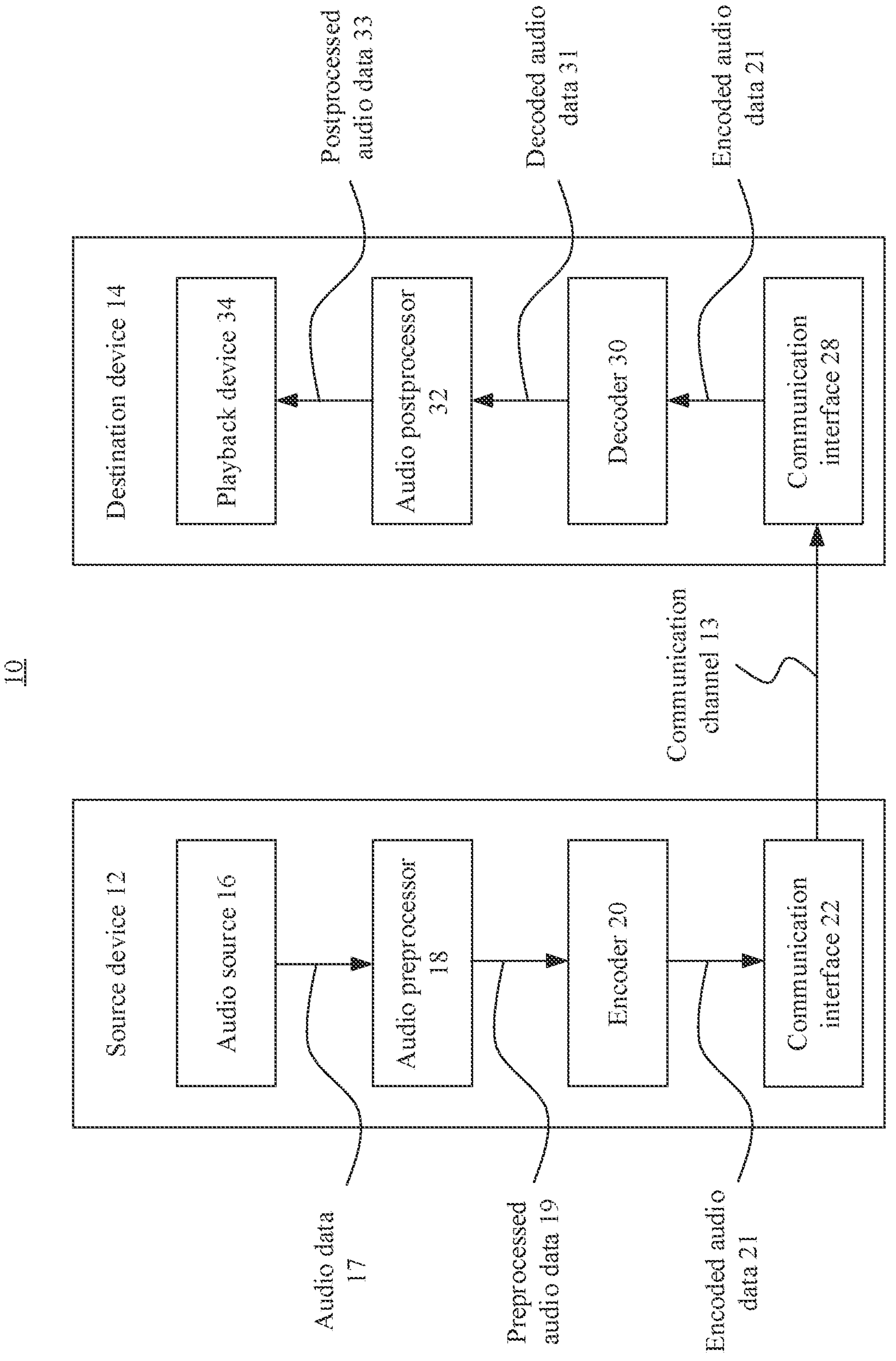
FIG. 1 is an example of a schematic block diagram of an audio coding system 10 used in this disclosure.

To make the objectives, technical solutions, and advantages of this disclosure clearer, the following clearly and completely describes the technical solutions in this disclosure with reference to the accompanying drawings in this disclosure. It is clear that the described embodiments are a part rather than all of embodiments of this disclosure. All other embodiments obtained by a person of ordinary skill in the art based on embodiments of this disclosure without creative efforts shall fall within the protection scope of this disclosure.

In the specification, embodiments, claims, and accompanying drawings of this disclosure, terms "first", "second", and the like are merely intended for distinguishing and description, and shall not be understood as an indication or implication of relative importance or an indication or implication of an order. In addition, terms "include", "have", and any variant thereof are intended to cover non-exclusive inclusion, for example, include a series of steps or units, methods, systems, products, or devices are not necessarily limited to those steps or units that are literally listed, but may include other steps or units that are not literally listed or that are inherent to such processes, methods, products, or devices.

It should be understood that in this disclosure, "at least one (item)" refers to one or more and "a plurality of" refers to two or more. The term "and/or" is used for describing an association relationship between associated objects, and represents that three relationships may exist. For example, "A and/or B" may represent the following three cases: Only A exists, only B exists, and both A and B exist, where A and B may be singular or plural. The character "/" usually indicates an "or" relationship between the associated objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

Explanations of related terms in this disclosure are as follows:

Audio frame: Audio data is in a stream form. During actual application, to facilitate audio processing and transmission, audio data within specific duration is usually selected as an audio frame. The duration is referred to as "sampling time", and a value of the duration may be determined based on a requirement of a codec and a specific application. For example, the duration is 2.5 milliseconds (ms) to 60 ms.

Audio signal: An audio signal is a carrier of information about regular changes of frequency and amplitude of a sound wave with voice, music, and sound effects. Audio is a continuously changing analog signal, and can be represented by a continuous curve and referred to as a sound wave. A digital signal generated from the audio through analog-to-digital conversion or by using a computer is an audio signal. The sound wave has three important parameters: frequency, amplitude, and phase, which determine characteristics of the audio signal.

Channel signal: A channel signal refers to independent audio signals that are collected or played back in different spatial positions during recording or playback. Therefore, a quantity of channels is a quantity of audio sources during sound recording or a quantity of speakers during playback.

The following is a system architecture to which this disclosure is applied.

FIG. 1 is an example of a schematic block diagram of an audio coding system 10 used in this disclosure. As shown in FIG. 1, the audio coding system 10 may include a source device 12 and a destination device 14. The source device 12 generates a coded bitstream. Therefore, the source device 12 may be referred to as an audio encoding apparatus. The destination device 14 can decode the coded bitstream generated by the source device 12. Therefore, the destination device 14 may be referred to as an audio decoding apparatus.

The source device 12 includes an encoder 20, and optionally may include an audio source 16, an audio preprocessor 18, and a communication interface 22.

The audio source 16 may include or may be any type of audio capture device configured to capture a voice, music, a sound effect, and the like in the real world, and/or any type of audio generation device, for example, an audio processor or device configured to generate a voice, music, a sound effect, and the like. The audio source may be any type of memory or storage that stores the foregoing audio.

The audio preprocessor 18 is configured to receive (raw) audio data 17 and preprocess the audio data 17 to obtain preprocessed audio data 19. For example, preprocessing performed by the audio preprocessor 18 may include trimming or denoising. It can be understood that the audio preprocessing unit 18 may be an optional component.

The encoder 20 is configured to receive the preprocessed audio data 19 and provide encoded audio data 21.

The communication interface 22 in the source device 12 may be configured to receive the encoded audio data 21 and send the encoded audio data 21 to the destination device 14 over a communication channel 13, for storage or direct reconstruction.

The destination device 14 includes a decoder 30, and optionally, may include a communication interface 28, an audio postprocessor 32, and a playback device 34.

The communication interface 28 of the destination device 14 is configured to directly receive the encoded audio data 21 from the source device 12, and provide the encoded audio data 21 to the decoder 30.

The communication interface 22 and the communication interface 28 may be configured to transmit or receive the encoded audio data 21 over a direct communication link between the source device 12 and the destination device 14, for example, a direct wired or wireless connection, or via any kind of network, for example, a wired or wireless network or any combination thereof, or any kind of private and public network, or any kind of combination thereof.

For example, the communication interface 22 may be configured to encapsulate the encoded audio data 21 into an appropriate format, for example, a packet, and/or process the encoded audio data 21 using any kind of transmission encoding or processing for transmission over a communication link or communication network.

The communication interface 28, forming the counterpart of the communication interface 22, may be, for example, configured to receive transmission data and process the transmission data using any type of corresponding transmission decoding or processing and/or decapsulating to obtain the encoded audio data 21.

Both the communication interface 22 and the communication interface 28 may be configured as unidirectional communication interfaces indicated by the arrow of the corresponding communication channel 13 from the source device 12 to the destination device 14 in FIG. 1, or configured as bidirectional communication interfaces, and may be configured to send and receive a message or the like, to establish a connection, confirm and exchange any other information related to the communication link and/or transmission of data, for example, encoded audio data.

The decoder 30 is configured to receive the encoded audio data 21 and provide decoded audio data 31.

The audio postprocessor 32 is configured to postprocess the decoded audio data 31 to obtain postprocessed audio data 33. Postprocessing performed by the audio postprocessor 32 may include, for example, trimming or resampling.

The playback device 34 is configured to receive the postprocessed audio data 33, to play audio to a user or a listener. The playback device 34 may be or include any type of player configured to play reconstructed audio, for example, an integrated or external speaker. For example, the speaker may include a loudspeaker, a sound box, and the like.

Figure 2:
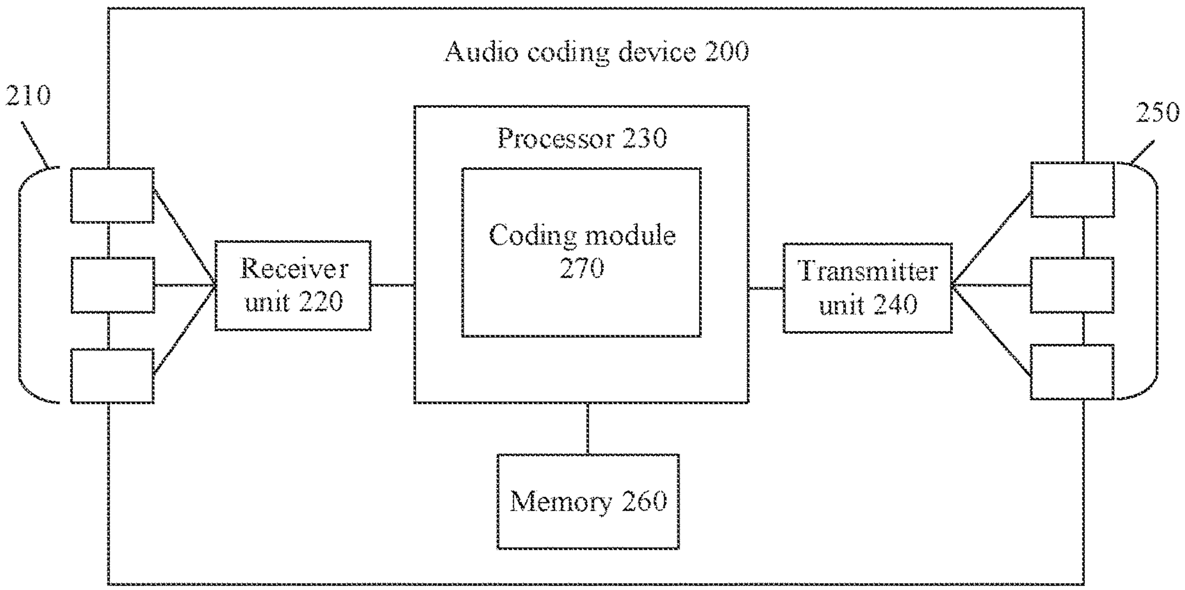
FIG. 2 is an example of a schematic block diagram of an audio coding device 200 used in this disclosure.

FIG. 2 is an example of a schematic block diagram of an audio coding device 200 used in this disclosure. In an embodiment, the audio coding device 200 may be an audio decoder (for example, the decoder 30 in FIG. 1) or an audio encoder (for example, the encoder 20 in FIG. 1).

The audio coding device 200 includes an ingress port 210 and a receiver unit (Rx) 220 for data reception, a processor, a logic unit, or a central processing unit 230 for data processing, a transmitter unit (Tx) 240 and an egress port 250 for data transmission, and a memory 260 for data storage. The audio coding device 200 may further include an optical-to-electrical conversion component and an electrical-to-optical (EO) component coupled to the ingress port 210, the receiver unit 220, the transmitter unit 240, and the egress port 250 for egress or ingress of optical or electrical signals.

The processor 230 is implemented by using hardware and software. The processor 230 may be implemented as one or more computer processing unit (CPU) chips, cores (for example, a multi-core processor), filed-programmable gate arrays (FPGAs), application-specific integrated circuits (ASICs), and digital signal processors (DSPs). The processor 230 communicates with the ingress port 210, the receiver unit 220, the transmitter unit 240, the egress port 250, and the memory 260. The processor 230 includes a coding module 270 (for example, an encoding module or a decoding module). The coding module 270 implements the embodiments disclosed in this disclosure, to implement the multi-channel audio signal coding method provided in this disclosure. For example, the coding module 270 implements, processes, or provides various coding operations. Therefore, the coding module 270 provides a substantial improvement to functions of the audio coding device 200 and affects a switching of the audio coding device 200 between different states. Alternatively, instructions stored in the memory 260 are executed by the processor 230, to implement the coding module 270.

The memory 260 includes one or more disks, tape drives, and solid-state drives and may be used as an overflow data storage device to store programs when such programs are selectively executed, and to store instructions and data that are read during program execution. The memory 260 may be volatile and/or non-volatile, and may be a read-only memory (ROM), a random-access memory (RAM), a ternary content-addressable memory, (TCAM), and/or a static random-access memory (SRAM).

Based on the description of the foregoing embodiment, this disclosure provides a multi-channel audio signal coding method.

Figure 3:
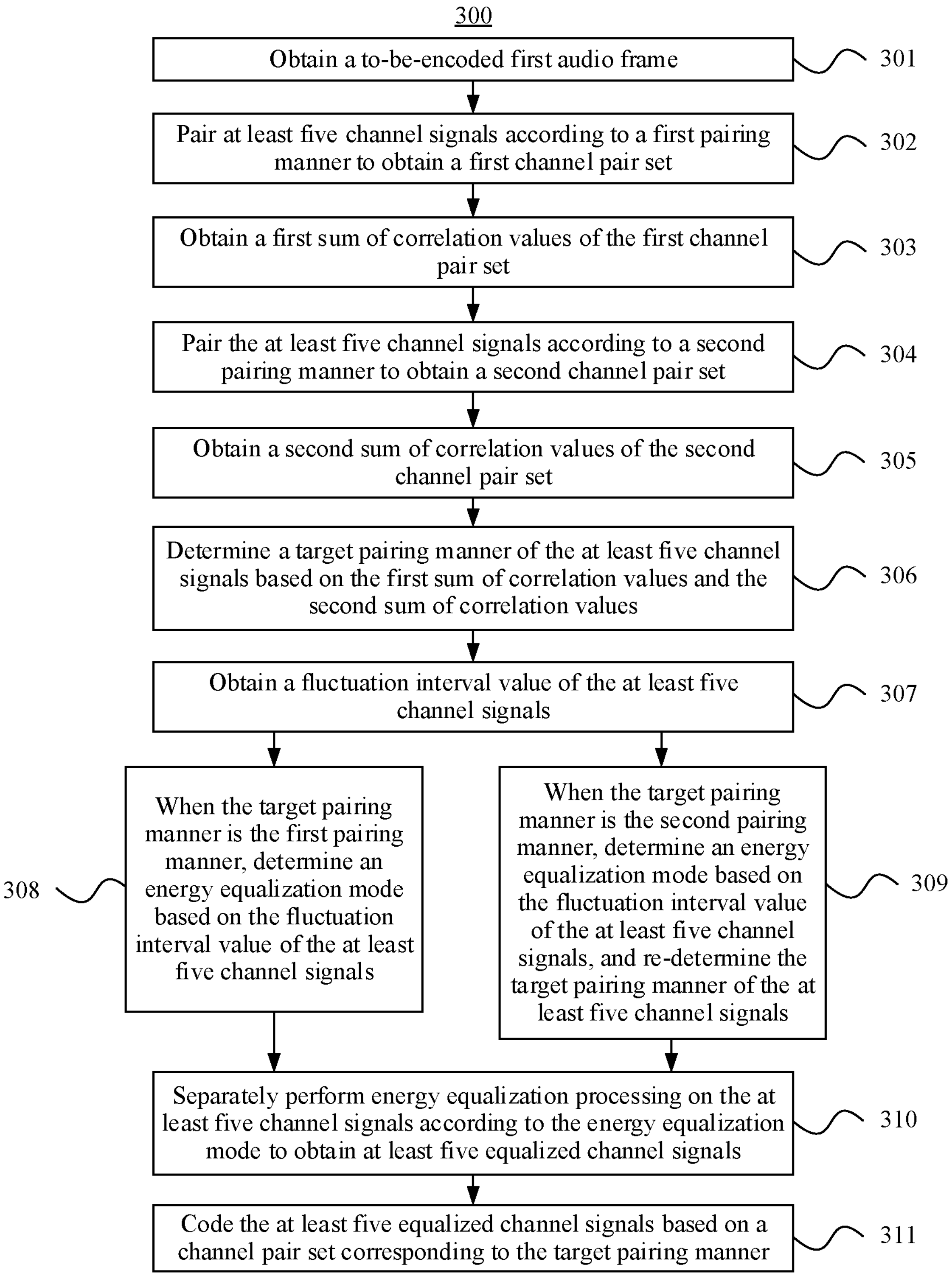
FIG. 3 is a flowchart of an example embodiment of a multi-channel audio signal coding method according to this disclosure.

FIG. 3 is a flowchart of an example embodiment of a multi-channel audio signal coding method according to this disclosure. The process 300 may be executed by the source device 12 in the audio coding system 10 or the audio coding device 200. The process 300 is described as a series of steps or operations. It should be understood that steps or operations of the process 300 may be performed in various sequences and/or simultaneously, not limited to an execution sequence shown in FIG. 3. As shown in FIG. 3, the method includes the following steps.

Step 301: Obtain a to-be-encoded first audio frame.

The first audio frame in this embodiment may be any frame of to-be-encoded multi-channel audio, and the first audio frame includes five or more channel signals. For example, the 5.1 channel includes six channel signals: a central (C) channel, a front left (L) channel, a front right (R) channel, a rear left surround (LS) channel, a rear right surround (RS) channel, and a 0.1 low-frequency effects (LFE) channel. The 7.1 channel includes eight channel signals: C, L, R, LS, RS, LB, RB, and LFE. The LFE is an audio channel of 3 Hertz (Hz) to 120 Hz, and is usually sent to a speaker specially designed for low tones.

Step 302: Pair the at least five channel signals according to a first pairing manner to obtain a first channel pair set.

The first channel pair set includes at least one channel pair, and the channel pair includes two channel signals of the at least five channel signals.

Step 303: Obtain a first sum of correlation values of the first channel pair set.

One channel pair has one correlation value, and the correlation value indicates correlation between two channel signals of one channel pair.

Encoding two highly correlated channel signals together can reduce redundancy and improve coding efficiency. Therefore, in this embodiment, pairing is performed based on a correlation value between two channel signals. To find a pairing manner with highest correlation as much as possible, correlation values between every two of the at least five channel signals in the first audio frame may be first calculated to obtain a correlation value set of the first audio frame. For example, five channel signals may form 10 channel pairs in total. Correspondingly, the correlation value set may include 10 correlation values.

Optionally, the correlation values may be normalized. In this way, the correlation values of all channel pairs are limited within a specific range, to set a unified determining standard for the correlation value, for example, a pairing threshold. The pairing threshold may be set to a value greater than or equal to 0.2 and less than or equal to 1, for example, 0.3. In this way, as long as a normalized correlation value of two channel signals is smaller than the pairing threshold, it is considered that the two channel signals have poor correlation and pairing for coding is not needed.

In a possible implementation, the following formula may be used to calculate a correlation value between two channel signals (for example, ch1 and ch2).

$$corr(ch1, ch2) = \frac{\sum_{i=1}^{N}(\text{spec\_ch1}(i) \times \text{spec\_ch2}(i))}{\sqrt{\sum_{i=1}^{N}(\text{spec\_ch1}(i) \times \text{spec\_ch1}(i)) \times \sum_{i=1}^{N}(\text{spec\_ch2}(i) \times \text{spec\_ch2}(i))}}$$

corr(ch1, ch2) is a normalized correlation value between the channel signal ch1 and the channel signal ch2, spec_ch1($i$) is a frequency domain coefficient of an $i^{th}$ frequency bin of the channel signal ch1, spec_ch2($i$) is a frequency domain coefficient of an $i^{th}$ frequency bin of the channel signal ch2, and N is a total quantity of frequency bins of an audio frame.

It should be noted that another algorithm or formula may also be used to calculate a correlation value between two channel signals. This is not specifically limited in this disclosure.

The first pairing manner includes: selecting a channel pair from channel pairs corresponding to the at least five channel signals, and adding the channel pair to the first channel pair set, to obtain a largest sum of correlation values. The first sum of correlation values is a sum of correlation values of all channel pairs in the first channel pair set obtained through pairing the at least five channel signals according to the first pairing manner. In this embodiment, the first pairing manner may include the following two implementations.

(1) Select M largest correlation values from the correlation value set. The M correlation values need to be greater than or equal to the pairing threshold, because a correlation value less than the pairing threshold indicates that correlation between two channel signals in a channel pair corresponding to the correlation value is low, and pairing for coding is not needed. To improve coding efficiency, it is unnecessary to select all correlation values greater than or equal to the pairing threshold. Therefore, an upper limit N of M is set, that is, at most N correlation values are selected.

N may be an integer greater than or equal to 2, and a maximum value of N cannot exceed a quantity of all channel pairs corresponding to all channel signals of the first audio frame. A larger value of N causes more calculation. A smaller value of N may cause loss of the channel pair set, reducing coding efficiency.

Optionally, N may be set to a maximum quantity of channel pairs plus 1, that is $$N = \left\lfloor \frac{CH}{2} \right\rfloor + 1,$$

where CH indicates a quantity of channel signals included in the first audio frame. For example, the 5.1 channel includes five channel signals, and N=3. The 7.1 channel includes seven channel signals, and N=4.

Then, M channel pair sets are obtained based on the M correlation values. Each channel pair set includes at least one of M channel pairs corresponding to the M correlation values, and when the channel pair set includes at least two channel pairs, the at least two channel pairs do not include a same channel signal. For example, for the 5.1 channel, three channel pairs corresponding to the largest correlation values selected based on the correlation value set are (L, R), (R, C), and (LS, RS), where (LS, RS) has a correlation value less than the pairing threshold, and therefore is excluded. Two channel pair sets may be obtained based on the remaining two channel pairs (L, R) and (R, C), where one of the two channel pair sets includes (L, R), and the other includes (R, C).

Using any one of the M channel pairs (for example, a first channel pair) corresponding to correlation values greater than or equal to the pairing threshold as an example, the method for obtaining the M channel pair sets in this embodiment may include: adding the first channel pair to the first channel pair set, where the M channel pair sets include the first channel pair set; when other channel pairs other than an associated channel pair in the plurality of channel pairs include a channel pair with a correlation value greater than the pairing threshold, selecting a channel pair with a largest correlation value from the other channel pairs and adding the channel pair to the first channel pair set, where the associated channel pair includes any channel signal included in a channel pair added to the first channel pair set.

Except the step of adding the first channel pair to the first channel pair set, steps of the foregoing process are all steps of iteration processing. Details are as follows.

a. Determine whether the other channel pairs except the associated channel in the plurality of channel pairs include a channel pair with a correlation value greater than the pairing threshold.

b. If a channel pair with a correlation value greater than the pairing threshold is included, select a channel pair with a largest correlation value from the other channel pairs, and add the channel pair to the first channel pair set.

In this case, as long as the other channel pairs include a channel pair with a correlation value greater than the pairing threshold, the foregoing step b may be performed iteratively.

Optionally, to reduce a calculation amount, a correlation value less than the pairing threshold may be deleted from the correlation value set. This can reduce a quantity of channel pairs and reduce a quantity of iterations.

(2) Obtain, based on a plurality of channel pairs, all channel pair sets corresponding to the at least five channel signals, obtain, based on the correlation value set, a sum of correlation values of all channel pairs included in any channel pair set in all the channel pair sets, and determine a channel pair set, in all the channel pair sets, corresponding to a largest sum of correlation values as a target channel pair set.

The correlation value set includes correlation values of the plurality of channel pairs of the at least five channel signals of the first audio frame. The plurality of channel pairs are regularly combined (that is, a plurality of channel pairs in a same channel pair set cannot include a same channel signal), to obtain a plurality of channel pair sets corresponding to the at least five channel signals.

In a possible implementation, when the quantity of channel signals is an odd number, the following formula may be used to calculate the quantity of all channel pair sets:

$$\text{Pair\_num} = \frac{C_{CH}^2 \times C_{CH-2}^2 \times \ldots \times C_3^2}{A_{CH/2}^{CH/2}}$$

In a possible implementation, when the quantity of channel signals is an even number, the following formula may be used to calculate the quantity of all channel pair sets:

$$\text{Pair\_num} = \frac{C_{CH}^2 \times C_{CH-2}^2 \times \ldots \times C_2^2}{A_{CH/2}^{CH/2}}$$

Pair_num indicates a quantity of all channel pair sets, CH indicates a quantity of channel signals participating in multi-channel processing in the first audio frame, and is a result obtained after screening through multi-channel masking.

Optionally, to reduce a calculation amount, after the correlation value set is obtained, the plurality of channel pair sets may be obtained based on other channel pairs other than a non-correlated channel pair in the plurality of channel pairs, where a correlation value of the non-correlated channel pair is less than the pairing threshold. In this way, the quantity of channel pairs participating in the calculation may be reduced when the channel pair sets are obtained. This reduces the quantity of channel pair sets, and reduces the calculation amount for the sum of correlation values in subsequent steps.

Step 304: Pair the at least five channel signals according to a second pairing manner to obtain a second channel pair set.

Step 305: Obtain a second sum of correlation values of the second channel pair set.

The second pairing manner includes: first adding, to the second channel pair set, a channel pair with a largest correlation value in the channel pairs corresponding to the at least five channel signals; and adding, to the second channel pair set, a channel pair with a largest correlation value in other channel pairs other than an associated channel pair in the channel pairs corresponding to the at least five channel signals, where the associated channel pair includes any channel signal included in a channel pair added to the first channel pair set. The second sum of correlation values is a sum of correlation values of all channel pairs in the second channel pair set obtained through pairing the at least five channel signals according to the second pairing manner.

Each time a channel pair is selected, only a channel pair corresponding to a current largest correlation value is selected and added to the second channel pair set.

Step 306: Determine a target pairing manner of the at least five channel signals based on the first sum of correlation values and the second sum of correlation values.

When the first sum of correlation values is greater than the second sum of correlation values, it is determined that the target pairing manner is the first pairing manner. When the first sum of correlation values is equal to the second sum of correlation values, it is determined that the target pairing manner is the second pairing manner.

Step 307: Obtain a fluctuation interval value of the at least five channel signals.

The fluctuation interval value indicates a difference between energy or amplitude of the at least five channel signals.

Step 308: When the target pairing manner is the first pairing manner, determine an energy equalization mode based on the fluctuation interval value of the at least five channel signals.

The energy equalization mode includes a first energy equalization mode and a second energy equalization mode. In the first energy equalization mode, two channel signals of a channel pair are used to obtain two equalized channel signals corresponding to the channel pair. In the second energy equalization mode, two channel signals in one channel pair and at least one channel signal not in the one channel pair are used to obtain two equalized channel signals corresponding to the one channel pair.

Determining an energy equalization mode based on the fluctuation interval value of the at least five channel signals may include: when the fluctuation interval value meets a preset condition, determining that the energy equalization mode is the first energy equalization mode; or when the fluctuation interval value does not meet the preset condition, determining that the energy equalization mode is the second energy equalization mode.

The fluctuation interval value includes energy flatness of the first audio frame, and the fluctuation interval value meeting the preset condition indicates that the energy flatness is less than a first threshold; or the fluctuation interval value includes amplitude flatness of the first audio frame, and the fluctuation interval value meeting the preset condition indicates that the amplitude flatness is less than a second threshold; or the fluctuation interval value includes energy deviation of the first audio frame, and the fluctuation interval value meeting the preset condition indicates that the energy deviation falls outside a first preset range; or the fluctuation interval value includes amplitude deviation of the first audio frame, and the fluctuation interval value meeting the preset condition indicates that the amplitude deviation falls outside a second preset range.

In this embodiment of the present disclosure, the energy flatness represents fluctuation of frame energy after energy normalization of a frequency domain coefficient of a current frame is performed on a plurality of channels screened by a multi-channel screening unit, and may be measured according to a flatness calculation formula. When energy of all channels of the current frame is the same, the energy flatness of the current frame is 1. When energy of a channel of the current frame is 0, the energy flatness of the current frame is 0. Therefore, a value range of the inter-channel energy flatness is [0, 1]. A larger fluctuation of inter-channel energy indicates a smaller value of the energy flatness. In an implementation, a unified first threshold, for example, 0.483, 0.492, or 0.504, may be set for all channel formats (for example, 5.1, 7.1, 9.1, and 11.1). In another implementation, different first thresholds are set for different channel formats. For example, the first threshold for the 5.1 channel format is 0.511, the first threshold for the 7.1 channel format is 0.563, the first threshold for the 9.1 channel format is 0.608, and the first threshold for the 11.1 channel format is 0.654.

The amplitude flatness represents fluctuation of frame amplitude after amplitude normalization of a frequency domain coefficient of a current frame is performed on a plurality of channels screened by a multi-channel screening unit, and may be measured according to a flatness calculation formula. When frame amplitude of all channels is the same, the flatness is 1. When frame amplitude of a channel is 0, the flatness is 0. Therefore, a range of the amplitude flatness is [0, 1]. A larger fluctuation of inter-channel amplitude indicates a smaller value of the flatness. In an implementation, a unified second threshold, for example, 0.695, 0.701, or 0.710, may be set for all channel formats (for example, 5.1, 7.1, 9.1, and 11.1). In another implementation, different second thresholds may be provided for different channel formats. For example, the second threshold for the 5.1 channel format may be 0.715, the second threshold for the 7.1 channel format may be 0.753, the second threshold for the 9.1 channel format may be 0.784, and the second threshold for the 11.1 channel format may be 0.809.

Because there is a square relationship between the amplitude and the energy, there is also a square relationship between the amplitude flatness and the energy flatness, that is, fluctuation of inter-channel frame amplitude corresponding to a square of the amplitude flatness is approximately equivalent to fluctuation of inter-channel frame energy corresponding to the energy flatness.

In this embodiment, the energy equalization mode may be determined based on the foregoing plurality of types of information indicating a fluctuation interval value of the at least five channel signals, where the information includes energy flatness, amplitude flatness, energy deviation, or amplitude deviation.

(1) Calculate energy values of the at least five channel signals, obtain the energy flatness of the first audio frame based on the energy values of the at least five channel signals, and when the energy flatness of the first audio frame is less than the first threshold, determine that the energy equalization mode is the first energy equalization mode; or when the energy flatness of the first audio frame is greater than or equal to the first threshold, determine that the energy equalization mode is the second energy equalization mode.

(2) Calculate amplitude values of the at least five channel signals, obtain the amplitude flatness of the first audio frame based on the amplitude values of the at least five channel signals, and when the amplitude flatness of the first audio frame is less than the second threshold, determine that the energy equalization mode is the first energy equalization mode; or when the amplitude flatness of the first audio frame is greater than or equal to the second threshold, determine that the energy equalization mode is the second energy equalization mode.

(3) Calculate energy values of the at least five channel signals, obtain the energy deviation of the first audio frame based on the energy values of the at least five channel signals, and when the energy deviation of the first audio frame falls outside the first preset range, determine that the energy equalization mode is the first energy equalization mode; or when the energy deviation of the first audio frame falls within the first preset range, determine that the energy equalization mode is the second energy equalization mode.

(4) Calculate amplitude values of the at least five channel signals, obtain the amplitude deviation of the first audio frame based on the amplitude values of the at least five channel signals, and when the amplitude deviation of the first audio frame falls outside the second preset range, determine that the energy equalization mode is the first energy equalization mode; or when the amplitude deviation of the first audio frame falls within the second preset range, determine that the energy equalization mode is the second energy equalization mode.

It should be noted that another energy equalization mode may further be used in this disclosure. This is not specifically limited herein.

In a possible implementation, before an energy equalization mode is determined based on the fluctuation interval value of the at least five channel signals, the energy equalization mode may be first determined based on a coding bit rate corresponding to the first audio frame, that is, whether the coding bit rate is greater than a bit rate threshold is determined. When the coding bit rate is greater than the bit rate threshold, it is determined that the energy equalization mode is the second energy equalization mode. When the coding bit rate is less than or equal to the bit rate threshold, the energy equalization mode is determined based on the fluctuation interval value of the at least five channel signals.

Step 309: When the target pairing manner is the second pairing manner, determine an energy equalization mode based on the fluctuation interval value of the at least five channel signals, and re-determine the target pairing manner of the at least five channel signals.

When the fluctuation interval value meets the preset condition, it is determined that the target pairing manner is the first pairing manner, and the energy equalization mode is the first energy equalization mode. When the fluctuation interval value does not meet the preset condition, it is determined that the target pairing manner is the second pairing manner, and the energy equalization mode is the second energy equalization mode.

For the fluctuation interval value and the fluctuation interval value meeting the preset condition, refer to step 308. Details are not described herein again.

Step 310: Separately perform energy equalization processing on the at least five channel signals according to the energy equalization mode to obtain at least five equalized channel signals.

When the energy equalization mode is the first energy equalization mode, for a current channel pair in a target channel pair set corresponding to the pairing manner, an average value of energy or amplitude values of two channel signals included in the current channel pair may be calculated; and energy equalization processing is separately performed on the two channel signals based on the average value to obtain two corresponding equalized channel signals.

In this way, when the fluctuation interval value of the at least five channel signals is large, energy equalization may be performed only between two correlated channel signals, so that bit allocation during stereo processing more adapts to a fluctuation interval value of channel signals. This avoids a problem that in a low bit rate coding environment, coding noise of a channel pair with high energy may be much greater than coding noise of a channel pair with low energy due to bit insufficiency, and the channel pair with low energy has bit redundancy.

When the energy equalization mode is the second energy equalization mode, an average value of energy or amplitude values of the at least five channel signals may be calculated, and energy equalization processing is separately performed on the at least five channel signals based on the average value, to obtain the at least five equalized channel signals.

Step 311: Encode the at least five equalized channel signals based on a channel pair set corresponding to the target pairing manner.

Optionally, if the energy equalization processing is not performed on the at least five channel signals in the foregoing step, the coding object is the at least five channel signals instead of the equalized channel signals.

In this embodiment, two pairing manners are combined, to determine, based on a sum of correlation values corresponding to a pairing manner, whether to use a pairing manner in a conventional technology or use a pairing manner with a largest sum of correlation values, and an energy equalization mode is determined based on a fluctuation interval value of channel signals, so that energy equalization more adapts to a fluctuation interval value of channels, making an audio frame coding method more diversified and efficient.

The following describes, by using two specific embodiments, a process of determining a pairing manner and an energy equalization mode in the method embodiment shown in FIG. 3. The 5.1 channel is used as an example. The 5.1 channel includes a C channel, an L channel, an R channel, an LS channel, an RS channel, and a 0.1 LFE channel. As shown in Table 1, channel indexes are set for the six channel signals.

TABLE 1

| Channel index | Channel signal |
|---|---|
| 0 | L |
| 1 | R |
| 2 | LS |
| 3 | RS |
| 4 | C |
| 5 | LFE |

Figure 4:
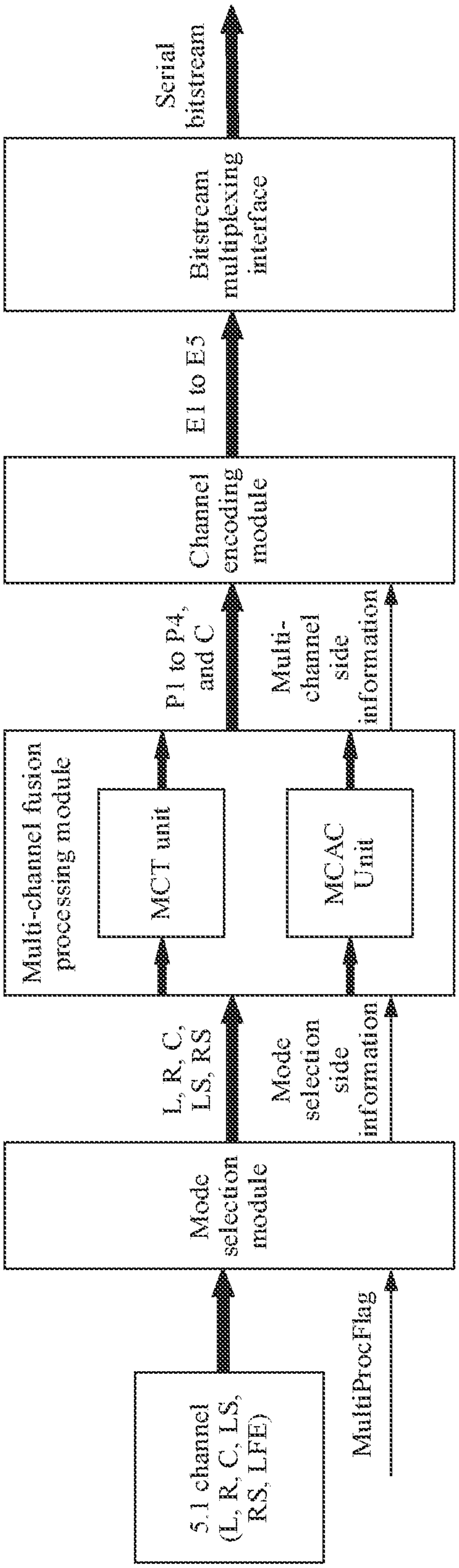
FIG. 4 is an example diagram depicting a structure of a coding apparatus to which a multi-channel audio signal coding method is applied according to this disclosure.

FIG. 4 is an example diagram depicting a structure of a coding apparatus to which a multi-channel audio signal coding method is applied according to this application. The coding apparatus may be the encoder 20 of the source device 12 in the audio coding system 10, or may be the coding module 270 in the audio coding device 200. The coding apparatus may include a mode selection module, a multi-channel fusion processing module, a channel encoding module, and a bitstream multiplexing interface.

An input of the mode selection module includes six channel signals (L, R, C, LS, RS, LFE) of the 5.1 channel and a multi-channel processing indicator (MultiProcFlag), and an output includes five filtered channel signals (L, R, C, LS, RS) and mode selection side information. The mode selection side information includes an energy equalization mode (pair energy equalization mode or overall energy equalization mode), a pairing manner (multi-channel coding tool (MCT) pairing or multi-channel adaptive coupling (MCAC) pairing), and correlation value side information (global correlation value side information or MCT correlation value side information) corresponding to the pairing manner.

The multi-channel fusion processing module includes an MCT unit and an MCAC unit.

An energy equalization mode and a module of the two modules performing energy equalization processing and stereo processing on the five channel signals (L, R, C, LS, and RS) may be determined based on the mode selection side information. The output includes processed channel signals (P1 to P4, and C) and multi-channel side information, and the multi-channel side information includes a channel pair set.

The channel encoding module uses a monophonic coding unit (or a monophonic box or a monophonic tool) to code the processed channel signals (P1 to P4, and C) output by the multi-channel fusion processing module, and outputs corresponding encoded channel signals (E1 to E5). In the process in which the monophonic coding unit codes the channel signals, more bits are allocated to a channel signal with higher energy (or higher amplitude), and fewer bits are allocated to a channel signal with lower energy (or lower amplitude). Optionally, the channel encoding module may also use a stereo coding unit, for example, a parameter stereo coder or a loss stereo coder, to code the processed channel signal output by the multi-channel processing module.

It should be noted that an unpaired channel signal (for example, C) may be directly input into the channel encoding module to obtain the encoded channel signal E5.

The bitstream multiplexing interface generates coded multi-channel signals. The coded multi-channel signals include the encoded channel signals (E1 to E5) output by the channel encoding module and side information (including the mode selection side information and the multi-channel side information). Optionally, the bitstream multiplexing interface may process the coded multi-channel signal into a serial signal or a serial bitstream.

Figure 5A:
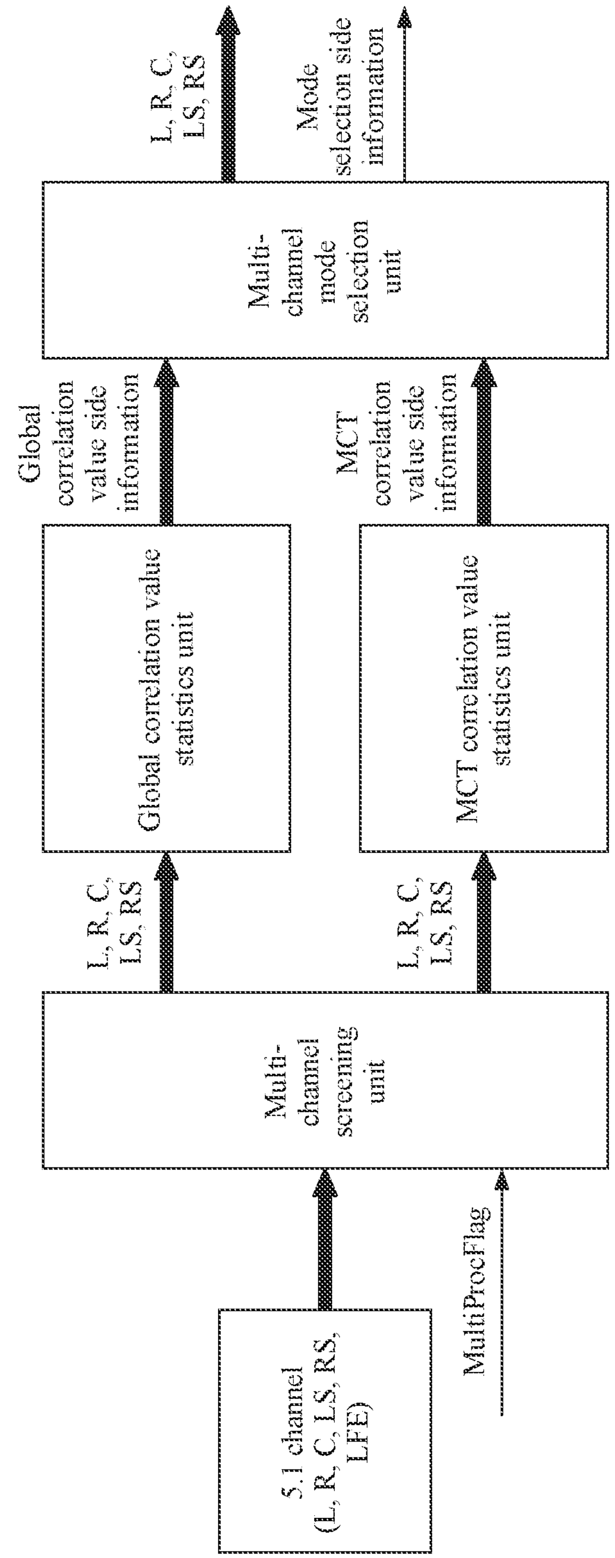
FIG. 5A is an example diagram depicting a structure of a mode selection module.

FIG. 5A is an example diagram depicting a structure of a mode selection module. As shown in FIG. 5A, the mode selection module includes a multi-channel screening unit, a global correlation value statistics unit, an MCT correlation value statistics unit, and a multi-channel mode selection unit.

The multi-channel screening unit screens out the five channel signals participating in multi-channel processing, namely, L, R, C, LS, and RS, from the six channel signals (L, R, C, LS, RS and LFE) based on the multi-channel processing indicator (MultiProcFlag).

The global correlation value statistics unit first calculates a normalized correlation value between any two of the channel signals L, R, C, LS, and RS that participate in multi-channel processing. In this disclosure, a correlation value between two channel signals (for example, a channel signal ch1 and a channel signal ch2) may be calculated according to the following formula:

$$corr(ch1, ch2) = \frac{\sum_{i=1}^{N}(\text{spec\_ch1}(i)\times\text{spec\_ch2}(i))}{\sqrt{\sum_{i=1}^{N}(\text{spec\_ch1}(i)\times\text{spec\_ch1}(i))\times\sum_{i=1}^{N}(\text{spec\_ch2}(i)\times\text{spec\_ch2}(i))}}$$

corr(ch1, ch2) is a normalized correlation value between the channel signal ch1 and the channel signal ch2, spec_ch1($i$) is a frequency domain coefficient of an $i^{th}$ frequency bin of the channel signal ch1, spec_ch2($i$) is a frequency domain coefficient of an $i^{th}$ frequency bin of the channel signal ch2, and N is a total quantity of frequency bins of an audio frame. Then, a largest sum of correlation values (that is, a sum of correlation values of all channel pairs included in a channel pair set) and a channel pair set (which is considered as a target channel pair set) corresponding to the maximum sum of correlation values are determined, based on the normalized correlation value between any two channel signals, from all channel pair sets corresponding to channel signals participating in multi-channel processing. Finally, the global correlation value side information is output, and the global correlation value side information includes the largest sum of correlation values corr_sum_max and the target channel pair set. It is assumed that the target channel pair set includes (R, C) and (LS, RS), and the largest sum of correlation values is corr_sum_max=corr(L, R)+corr(LS, RS).

The MCT correlation value statistics unit first calculates a normalized correlation value between any two of the five channel signals L, R, C, LS, and RS that participate in multi-channel processing. Similarly, a correlation value between two channel signals (for example, the channel signal ch1 and the channel signal ch2) may be calculated by using the foregoing formula: Then, a channel pair (for example, L and R) corresponding to a largest correlation value is selected in first iteration processing and added to a target channel pair set, a correlation value of a channel pair including L and/or R is deleted in second iteration processing, and a channel pair (for example, LS and RS) corresponding to a largest correlation value is selected from remaining correlation values and added to the target channel pair set, and so on, until the correlation values are cleared. Finally, the MCT correlation value side information is output, where the MCT correlation value side information includes the target channel pair set and the sum of correlation values corr_sum_curr corresponding to the target channel pair set. It is assumed that the target channel pair set includes (R, C) and (LS, RS), and the sum of correlation values is corr_sum_curr=corr(L, R)+corr(LS, RS).

It should be noted that, after obtaining the normalized correlation value between any two channel signals, the global correlation value statistics unit and the MCT correlation value statistics unit may filter the correlation value based on a set pairing threshold. That is, a correlation value greater than or equal to the pairing threshold is retained, and a correlation value less than the pairing threshold is deleted or set to 0. In this way, a calculation amount can be reduced.

Figure 5B:
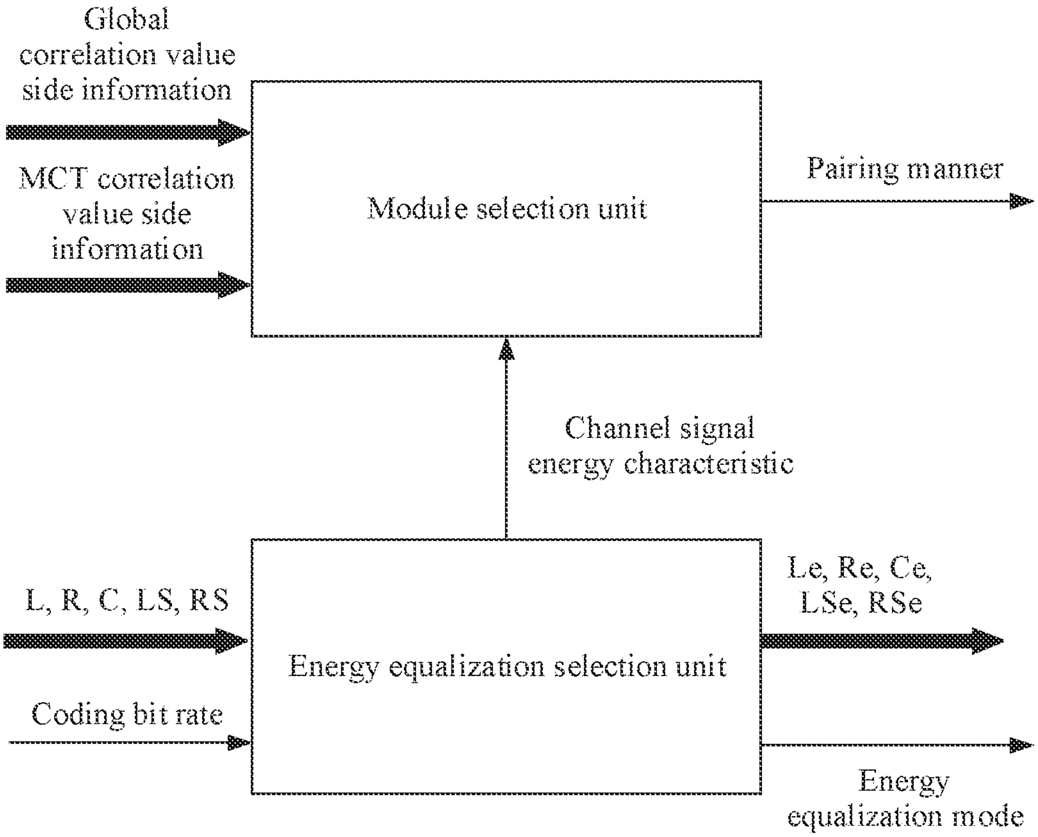
FIG. 5B is an example diagram depicting a structure of a multi-channel mode selection unit.

FIG. 5B is an example diagram depicting a structure of a multi-channel mode selection unit. As shown in FIG. 5B, the multi-channel mode selection unit includes a module selection unit and an energy equalization selection unit.

The module selection unit determines a pairing manner based on the global correlation value side information and the MCT correlation value side information. When corr_sum_max>corr_sum_curr, the pairing manner is the multi-channel adaptive coupling (MCAC) used by the global correlation value statistics unit. When corr_sum_max=corr_sum_curr, the pairing manner is the MCT pairing used by the MCT correlation value statistics unit.

Further, when the pairing manner is the MCT pairing, the module selection unit further determines a target pairing manner based on a fluctuation interval value of a plurality of channel signals provided by the energy equalization selection unit. For example, when energy flatness of the five channel signals (L, R, C, LS, and RS) is less than a first threshold, the target pairing manner is the MCAC pairing. When the energy flatness of the five channel signals (L, R, C, LS, and RS) is greater than or equal to the first threshold, the target pairing manner is the MCT pairing.

It should be noted that, when it is determined for the first time that the target pairing manner is the MCT pairing, the energy equalization mode of the five channel signals and the final target pairing manner may be determined at a time based on the fluctuation interval value of the plurality of channel signals provided by the energy equalization selection unit. For example, when the energy flatness of the five channel signals (L, R, C, LS, and RS) is less than the first threshold, the target pairing manner is the MCAC pairing, and the energy equalization mode is the first energy equalization mode. When the energy flatness of the five channel signals (L, R, C, LS, and RS) is greater than or equal to the first threshold, the pairing manner is the MCT pairing, and the energy equalization mode is the second energy equalization mode.

The energy equalization selection unit first calculates an energy or amplitude value of each channel signal. In this disclosure, an energy or amplitude value of a channel signal (ch) may be calculated according to the following formula:

$$\text{energy}(ch) = \sqrt{\sum_{i=1}^{N} \text{spec\_coeff}(ch, i) \times \text{spec\_coeff}(ch, i)}$$

energy(ch) is an energy or amplitude value of the channel signal ch, sepc_coeff(ch, i) is a frequency domain coefficient of an $i^{th}$ frequency bin of the channel signal ch, and N is a total quantity of frequency bins of an audio frame.

Then, a normalized energy or amplitude value of each channel signal is calculated. In this disclosure, a normalized energy or amplitude value of a channel signal (ch) may be calculated according to the following formula:

$$\text{energy\_uniform} = \frac{\text{energy}(ch)}{\text{energy\_max}}$$

energy_uniform(ch) is the normalized energy or amplitude value of the channel signal ch, and energy_max is a maximum value of energy or amplitude values of the five channel signals (that is, energy(L), energy(R), energy(C), energy(LS), and energy(RS)). If energy_max=0, all energy_uniform(ch)s are 0.

Next, the fluctuation interval value of the five channel signals is calculated. Optionally, the fluctuation interval value may be the energy flatness. In this disclosure, the energy flatness of the five channel signals may be calculated according to the following formula:

$$efm = \frac{\sqrt[5]{\prod_{ch=0}^{4} \text{energy\_uniform}(ch)}}{\frac{1}{5}\sum_{ch=0}^{4} \text{energy\_uniform}(ch)}$$

efm is the energy flatness of the five channel signals. For channel indexes of L, R, C, LS, and RS, refer to Table 1.

Optionally, the fluctuation interval value may also be energy deviation. Based on the normalized energy or amplitude value energy_uniform(ch) obtained through the foregoing calculation, in this disclosure, an average energy or amplitude value of the five channel signals may be calculated according to the following formula:

$$\text{avg\_energy} = \frac{1}{5} \times \sum_{ch=0}^{4} \text{energy\_uniform}(ch)$$

avg_energy_uniform is the average energy or amplitude value of the five channel signals. For channel indexes of L, R, C, LS, and RS, refer to Table 1.

The energy deviation of the channel signal (ch) is calculated according to the following formula:

$$\text{deviation}(ch) = \frac{\text{energy\_uniform}(ch)}{\text{avg\_energy\_uniform}}$$

deviation(ch) is the energy deviation of the channel signal ch. A maximum value of the energy deviation of L, R, C, LS, and RS is determined as the energy deviation (deviation) of the five channel signals.

Optionally, the fluctuation interval value may alternatively be an amplitude value or amplitude deviation. A principle of the fluctuation interval value is similar to the foregoing energy-related value, and details are not described herein again.

As described above, the energy equalization mode in this disclosure includes two implementations. In the pair energy equalization mode, for each channel pair in a target channel pair set corresponding to a pairing manner determined by the module selection unit, two channel signals of a channel pair are used to obtain two equalized channel signals corresponding to the channel pair. In the overall energy equalization mode, two channel signals in one channel pair and at least one channel signal not in the one channel pair are used to obtain two equalized channel signals corresponding to the one channel pair. For a channel signal not paired, a corresponding equalized channel signal is the channel signal itself.

The energy equalization selection unit determines the energy equalization mode based on the fluctuation interval value in the following two determining manners:

(1) When efm is less than the first threshold, the energy equalization mode is the pair energy equalization mode. When efm is greater than or equal to the first threshold, the energy equalization mode is the overall energy equalization mode.

(2) When deviation falls within a value range [threshold, 1/threshold], the energy equalization mode is the overall energy equalization mode. When deviation falls outside the value range [threshold, 1/threshold], the energy equalization mode is the pair energy equalization mode. A value range of threshold may be (0, 1).

deviation may represent a ratio of frequency domain amplitude of each channel in a current frame to an average value of frequency domain amplitude of all channels in the current frame, that is, the amplitude deviation. When a proportion between frequency domain amplitude of a current channel in a current frame and an average value of frequency domain amplitude of all channels in the current frame is less than 5 (corresponding to threshold=0.2), there may be two cases: 1. The frequency domain amplitude of the current channel is less than or equal to the average value of the frequency domain amplitude of all the channels in the current frame, and "the frequency domain amplitude of the current channel/the average value of the frequency domain amplitude of all the channels in the current frame" that meets the condition is between (0.2, 1], that is, between (threshold, 1]. 2. The frequency domain amplitude of the current channel is greater than the average value of the frequency domain amplitude of all the channels in the current frame, and "the frequency domain amplitude of the current channel/the average value of frequency domain amplitude of all the channels in the current frame" that meets the condition is between (1, 5). In combination with the foregoing two cases, when the proportion between the frequency domain amplitude of the current channel and the average value of the frequency domain amplitude of all the channels in the current frame is less than 5, the range of "the frequency domain amplitude of the current channel/the average value of the frequency domain amplitude of all the channels in the current frame" that meets the condition is between (0.2, 5), that is, between (threshold, 1/threshold), where (threshold, 1/threshold) is the second preset range. The value of threshold may be between (0, 1). A smaller value of threshold indicates larger fluctuation of the frequency domain amplitude of the current channel relative to the average value of the frequency domain amplitude of all the channels in the current frame, and a larger value of threshold indicates smaller fluctuation of the frequency domain amplitude of the current channel relative to the average value of the frequency domain amplitude of all the channels in the current frame. The value of threshold may be 0.2, 0.15, 0.125, 0.11, 0.1, or the like.

deviation may also represent a ratio of frequency domain energy of each channel to an average value of frequency domain energy of all channels, that is, energy deviation. When a proportion between frequency domain energy of a current channel in a current frame and an average value of frequency domain energy of all channels in the current frame is less than 25 (threshold=0.04), there may be two cases: 1. The frequency domain energy of the current channel is less than or equal to the average value of the frequency domain energy of all the channels in the current frame, and "the frequency domain energy of the current channel/the average value of the frequency domain energy of all the channels in the current frame" that meets the condition is between (0.04, 1], that is, between (threshold, 1]. 2. The frequency domain energy of the current channel is greater than the average value of the frequency domain energy of all the channels in the current frame, and "the frequency domain energy of the current channel/the average value of frequency domain energy of all the channels in the current frame" that meets the condition is between (1, 25). In combination with the foregoing two cases, when the proportion between the frequency domain energy of the current channel and the average value of the frequency domain energy of all the channels in the current frame is less than 25, the range of "the frequency domain energy of the current channel/the average value of the frequency domain energy of all the channels in the current frame" that meets the condition is between (0.04, 25), that is, between (threshold, 1/threshold), where (threshold, 1/threshold) is the first preset range. threshold may be between (0, 1). A smaller value of threshold indicates larger fluctuation of the frequency domain energy of the current channel relative to the average value of the frequency domain energy of all the channels in the current frame, and a larger value of threshold indicates smaller fluctuation of the frequency domain energy of the current channel relative to the average value of the frequency domain energy of all the channels in the current frame. The value of Threshold may be 0.04, 0.0225, 0.015625, 0.0121, 0.01, or the like.

Because there is a square relationship between the amplitude and the energy, there is also a square relationship between the amplitude deviation and the energy deviation, that is, fluctuation of inter-channel frame amplitude corresponding to a square of the amplitude deviation is approximately equivalent to fluctuation of inter-channel frame energy corresponding to the energy deviation.

In another implementation, the first preset range may also be expanded to (0, 1/threshold). In this case, a range of pair energy equalization is [1/threshold, +∞), indicating that pair energy equalization is performed when the frequency domain energy of the current channel is greater than the average value of the frequency domain energy of all the channels in the current frame, and "the frequency domain energy of the current channel/the average value of the frequency domain energy of all the channels in the current frame" is greater than 1/threshold.

In another implementation, the second preset range may also be expanded to (0, 1/threshold). In this case, a range of pair amplitude equalization is [1/threshold, +∞), indicating that pair amplitude equalization is performed when the frequency domain amplitude of the current channel is greater than the average value of the frequency domain amplitude of all the channels in the current frame, and "the frequency domain amplitude of the current channel/the average value of the frequency domain amplitude of all the channels in the current frame" is greater than 1/threshold.

It should be noted that the energy equalization selection unit may calculate normalized energy or amplitude values based on the five channel signals, to obtain the energy flatness or energy deviation, or may calculate normalized energy or amplitude values based on only channel signals that are successfully paired, to obtain the energy flatness or energy deviation, or may calculate normalized energy or amplitude values based on a part of the five channel signals, to obtain the energy flatness or energy deviation. This is not specifically limited in this disclosure.

The multi-channel fusion processing module includes an MCT unit and an MCAC unit.

The MCT unit first performs energy equalization processing on the five channel signals (L, R, C, LS, and RS) according to the overall energy equalization mode to obtain Le, Re, Ce, LSe, and RSe, obtains a target channel pair set based on the MCT correlation value side information, and performs stereo processing on two equalized channel signals (for example, (Le, Re) or (LSe, RSe)) of a channel pair in the target channel pair set by using a stereo box.

The MCAC unit obtains a target channel pair set (for example, (L, R) and (LS, RS)) based on the global correlation value side information, and then performs energy equalization processing on two channel signals (for example, (L, R) and (LS, RS)) of a channel pair in the target channel pair set to obtain (Le, Re) and (LSe, RSe) according to an energy equalization mode, for example, the pair energy equalization mode, and then performs stereo processing on the equalized channel signals by using a stereo box. If the overall energy equalization mode is used, energy equalization processing is performed on the five channel signals to obtain Le, Re, Ce, LSe, and RSe, and then stereo processing is performed on two equalized channel signals (for example, (Le, Re) or (LSe, RSe)) in the channel pair by using a stereo box based on the target channel pair set.

A stereo processing unit may use prediction-based or Karhunen-Loeve transform (Karhunen-Loeve Transform, KLT)-based processing, that is, two input channel signals are rotated (for example, by using a 2×2 rotation matrix) to maximize energy compression, to concentrate signal energy in one channel.

After processing the two input channel signals, the stereo processing unit outputs processed channel signals (P1 to P4) corresponding to the two channel signals and multi-channel side information, and the multi-channel side information includes a sum of correlation values and a target channel pair set.

Figure 6:
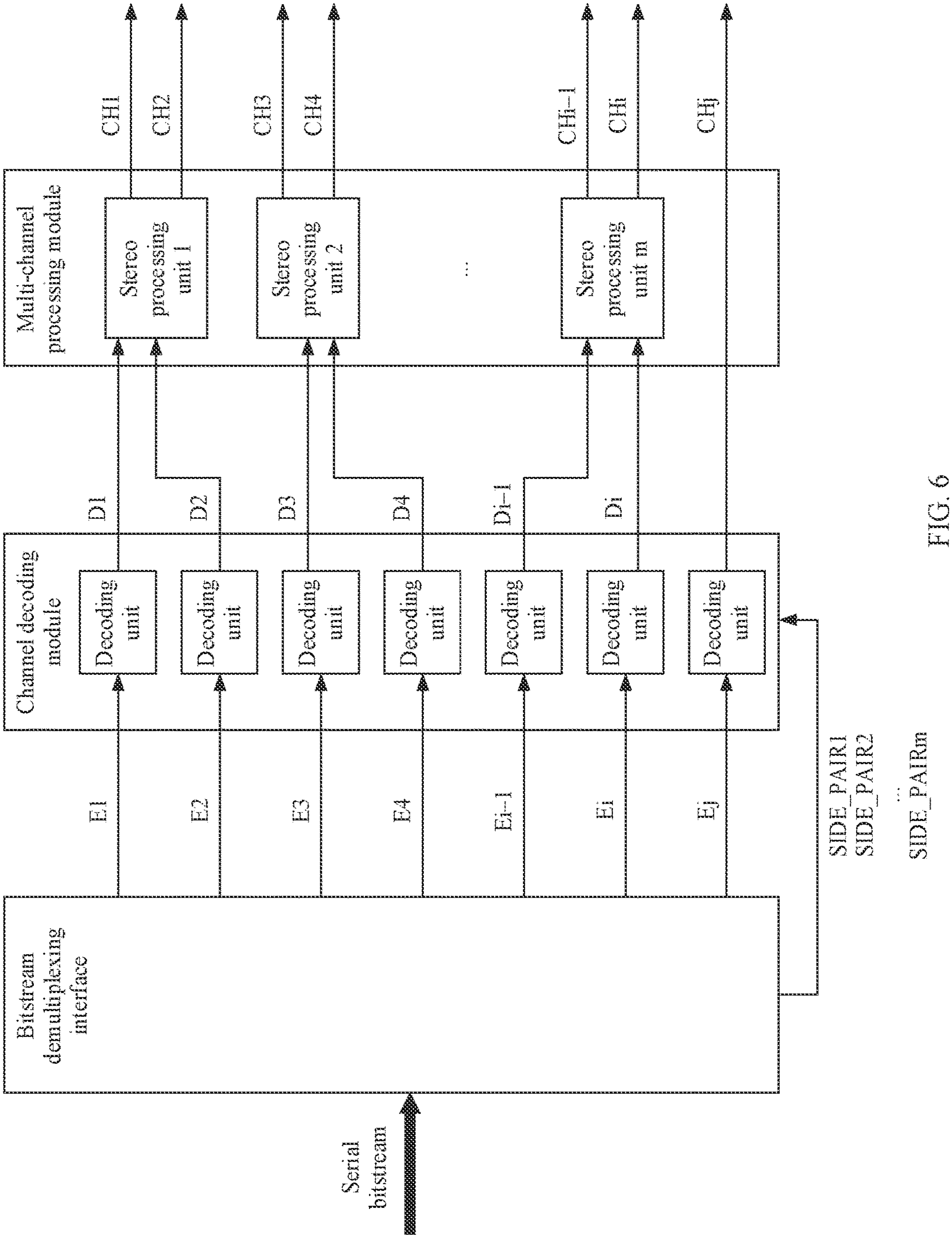
FIG. 6 is an example diagram depicting a structure of a decoding apparatus to which a multi-channel audio decoding method is applied according to this disclosure.

FIG. 6 is an example diagram depicting a structure of a decoding apparatus to which a multi-channel audio decoding method is applied according to this disclosure. The decoding apparatus may be the decoder 30 of the destination device 14 in the audio coding system 10, or may be the coding module 270 in the audio coding device 200. The decoding apparatus may include a bitstream demultiplexing interface, a channel decoding module, and a multi-channel processing module.

The bitstream demultiplexing interface receives an encoded multi-channel signal (for example, a serial bitstream (bitstream)) from an encoding apparatus, and obtains an encoded channel signal (E) and a multi-channel parameter (SIDE_PAIR) after demultiplexing, for example, E1, E2, E3, E4, . . . , Ei−1, Ei, and SIDE_PAIR1, SIDE_PAIR2, . . . , SIDE_PAIRm.

The channel decoding module decodes the encoded channel signals output by the bitstream demultiplexing interface by using a monophonic decoding unit (or a monophonic box or a monophonic tool) and outputs decoded channel signals (D). For example, E1, E2, E3, E4, . . . . Ei−1, and Ei are respectively decoded by the monophonic decoding unit to obtain D1, D2, D3, D4, . . . , Di−1, and Di.

The multi-channel processing module includes a plurality of stereo processing units. The stereo processing unit may use prediction-based or KLT-based processing, that is, two input channel signals are reversely rotated (for example, by using a 2×2 rotation matrix), to transform the signals to original signal directions.

Which two of the decoded channel signals output by the channel decoding module are paired can be identified based on the multi-channel parameters, and paired decoded channel signals are input to the stereo processing unit. After processing two input decoded channel signals, the stereo processing unit outputs channel signals (CH) corresponding to the two decoded channel signals. For example, a stereo processing unit 1 processes D1 and D2 based on SIDE_PAIR1 to obtain CH1 and CH2, a stereo processing unit 2 processes D3 and D4 based on SIDE_PAIR2 to obtain CH3 and CH4, . . . , and a stereo processing unit m processes Di−1 and Di based on SIDE_PAIRm to obtain CHi−1 and CHi.

It should be noted that a channel signal (for example, a CHj) that is not paired does not need to be processed by a stereo processing unit in the multi-channel processing module, and may be directly output after being decoded.

Figure 7:
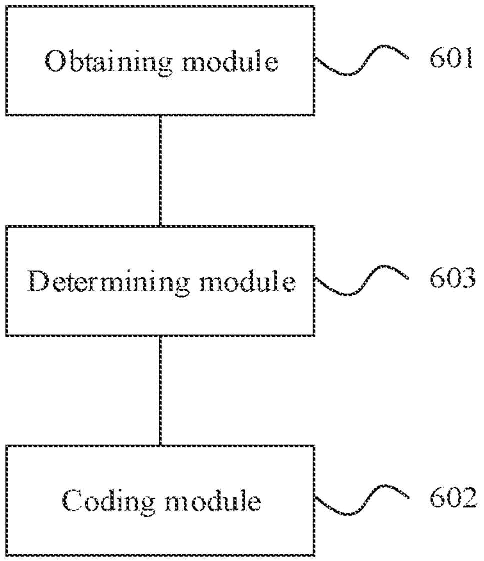
FIG. 7 is a schematic diagram depicting a structure of a coding apparatus embodiment according to this disclosure.

FIG. 7 is a schematic diagram depicting a structure of a coding apparatus embodiment according to this disclosure. As shown in FIG. 7, the apparatus may be applied to the source device 12 or the audio coding device 200 in the foregoing embodiments. The coding apparatus in this embodiment may include: an obtaining module 601, a coding module 602, and a determining module 603.

The obtaining module 601 is configured to: obtain a to-be-encoded first audio frame, where the first audio frame includes at least five channel signals; pair the at least five channel signals according to a first pairing manner to obtain a first channel pair set, where the first channel pair set includes at least one channel pair, and one channel pair includes two channel signals of the at least five channel signals; obtain a first sum of correlation values of the first channel pair set, where one channel pair has one correlation value, and the correlation value indicates correlation between two channel signals of the channel pair; pair the at least five channel signals according to a second pairing manner to obtain a second channel pair set; and obtain a second sum of correlation values of the second channel pair set. The determining module 603 is configured to determine a target pairing manner of the at least five channel signals based on the first sum of correlation values and the second sum of correlation values. The coding module 602 is configured to encode the at least five channel signals according to the target pairing manner, where the target pairing manner is the first pairing manner or the second pairing manner.

In a possible implementation, the determining module 603 is further configured to: when the first sum of correlation values is greater than the second sum of correlation values, determine that the target pairing manner is the first pairing manner; or when the first sum of correlation values is equal to the second sum of correlation values, determine that the target pairing manner is the second pairing manner.

In a possible implementation, the determining module 603 is further configured to: obtain a fluctuation interval value of the at least five channel signals; and when the target pairing manner is the first pairing manner, determine an energy equalization mode based on the fluctuation interval value of the at least five channel signals; or when the target pairing manner is the second pairing manner, determine an energy equalization mode based on the fluctuation interval value of the at least five channel signals, and re-determine the target pairing manner of the at least five channel signals. Correspondingly, the coding module 602 is further configured to: separately perform energy equalization processing on the at least five channel signals according to the energy equalization mode to obtain at least five equalized channel signals; and encode the at least five equalized channel signals according to the target pairing manner, where the energy equalization mode is a first energy equalization mode or a second energy equalization mode.

In a possible implementation, the determining module 603 is further configured to: when the fluctuation interval value meets a preset condition, determine that the energy equalization mode is the first energy equalization mode; or when the fluctuation interval value does not meet a preset condition, determine that the energy equalization mode is the second energy equalization mode.

In a possible implementation, the determining module 603 is further configured to: when the fluctuation interval value meets the preset condition, determine that the target pairing manner is the first pairing manner, and the energy equalization mode is the first energy equalization mode; or when the fluctuation interval value does not meet the preset condition, determine that the target pairing manner is the second pairing manner, and the energy equalization mode is the second energy equalization mode.

In a possible implementation, the determining module 603 is further configured to: determine whether a coding bit rate corresponding to the first audio frame is greater than a bit rate threshold; and when the coding bit rate is greater than the bit rate threshold, determine that the energy equalization mode is the second energy equalization mode; or when the coding bit rate is less than or equal to the bit rate threshold, determine the energy equalization mode based on the fluctuation interval value.

In a possible implementation, the fluctuation interval value includes energy flatness of the first audio frame, and the fluctuation interval value meeting the preset condition indicates that the energy flatness is less than a first threshold; or the fluctuation interval value includes amplitude flatness of the first audio frame, and the fluctuation interval value meeting the preset condition indicates that the amplitude flatness is less than a second threshold; or the fluctuation interval value includes energy deviation of the first audio frame, and the fluctuation interval value meeting the preset condition indicates that the energy deviation falls outside a first preset range; or the fluctuation interval value includes amplitude deviation of the first audio frame, and the fluctuation interval value meeting the preset condition indicates that the amplitude deviation falls outside a second preset range.

In a possible implementation, the obtaining module 601 is further configured to: select a channel pair from channel pairs corresponding to the at least five channel signals, and add the channel pair to the first channel pair set, to obtain a largest sum of correlation values.

In a possible implementation, the obtaining module 601 is further configured to: first add, to the second channel pair set, a channel pair with a largest correlation value in the channel pairs corresponding to the at least five channel signals; and add, to the second channel pair set, a channel pair with a largest correlation value in other channel pairs other than an associated channel pair in the channel pairs corresponding to the at least five channel signals, where the associated channel pair includes any channel signal included in a channel pair added to the first channel pair set.

In a possible implementation, when the energy equalization mode is the first energy equalization mode, the coding module 602 is further configured to: calculate, for a current channel pair in a target channel pair set corresponding to the pairing manner, an average value of energy or amplitude values of two channel signals included in the current channel pair; and separately perform energy equalization processing on the two channel signals based on the average value to obtain two corresponding equalized channel signals.

In a possible implementation, when the energy equalization mode is the second energy equalization mode, the coding module 602 is further configured to: calculate an average value of energy or amplitude values of the at least five channel signals; and separately perform energy equalization processing on the at least five channel signals based on the average value to obtain the at least five equalized channel signals.

The apparatus in this embodiment may be configured to execute the technical solution of the method embodiment shown in FIG. 3, implementation principles and technical effects of the apparatus and the method embodiment are similar, and details are not described herein.

Figure 8:
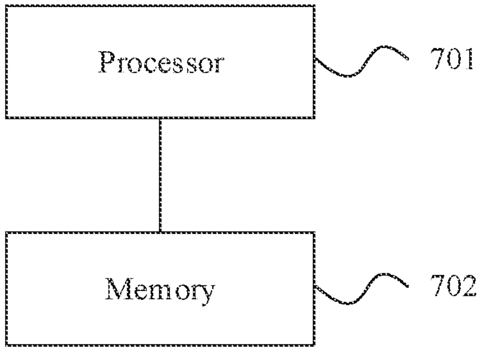
FIG. 8 is a schematic diagram depicting a structure of a device embodiment according to this disclosure.

FIG. 8 is a schematic diagram depicting a structure of a device embodiment according to this disclosure. As shown in FIG. 8, the device may be a coding device in the foregoing embodiment. The device in this embodiment may include a processor 701 and a memory 702, and the memory 702 is configured to store one or more programs. When the one or more programs are executed by the processor 701, the processor 701 is enabled to implement the technical solution of the method embodiment shown in FIG. 3.

In an implementation process, the steps in the foregoing method embodiments can be implemented by using a hardware integrated logic circuit in the processor, or by using instructions in a form of software. The processor may be a general-purpose processor, a digital signal processor (DSP), an application-specific integrated circuit (ASIC), a field-programmable gate array (FPGA) or another programmable logic device, a discrete gate or transistor logic device, or a discrete hardware component. The general-purpose processor may be a microprocessor, any conventional processor, or the like. The steps of the methods disclosed with reference to this disclosure may be directly performed by a hardware coding processor, or may be performed by a combination of hardware and a software module in a coding processor. The software module may be located in a mature storage medium in the art, such as a RAM, a flash memory, a ROM, a programmable ROM (PROM), an electrically erasable PROM (EEPROM), or a register. The storage medium is located in the memory, and the processor reads information in the memory and completes the steps in the foregoing methods in combination with hardware of the processor.

The memory in the foregoing embodiments may be a volatile memory or a non-volatile memory, or may include both a volatile memory and a non-volatile memory. The non-volatile memory may be a ROM, a PROM, an erasable PROM (EPROM), an EEPROM, or a flash memory. The volatile memory may be a RAM, used as an external cache. By way of example but not limitative description, many forms of RAMs are available, for example, a static RAM (SRAM), a dynamic RAM (DRAM), a synchronous DRAM (SDRAM), a double data rate synchronous DRAM (DDR SDRAM), an enhanced SDRAM (ESDRAM), a SynchLink DRAM (SLDRAM), and a direct Rambus RAM (DR RAM). It should be noted that the memory of the systems and methods described in this specification includes but is not limited to these and any memory of another proper type.

A person of ordinary skill in the art may be aware that, in combination with units and algorithm steps in the examples described in embodiments disclosed in this specification, this disclosure can be implemented by electronic hardware or a combination of computer software and electronic hardware. Whether the functions are implemented by hardware or software depends on particular applications and design constraint conditions of the technical solutions. A person skilled in the art may use different methods to implement the described functions for each particular application, but it should not be considered that the implementation goes beyond the scope of this disclosure.

A person skilled in the art may clearly understand that, for the purpose of convenient and brief description, for detailed working processes of the foregoing system, apparatus, and unit, refer to corresponding processes in the foregoing method embodiments. Details are not described herein again.

In the several embodiments provided in this disclosure, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, to be specific, may be located in one position, or may be distributed on a plurality of network units. A part or all of the units may be selected according to actual requirements to achieve the objectives of the solutions of the embodiments.

In addition, functional units in embodiments of this disclosure may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions in this disclosure essentially, or the part contributing to the conventional technology, or a part of the technical solutions may be implemented in a form of a software product. The computer software product is stored in a storage medium and includes several instructions for instructing a computer device (a personal computer, a server, a network device, or the like) to perform all or a part of the steps of the methods in embodiments of this disclosure. The foregoing storage medium includes any medium that can store program code, such as a universal serial bus (USB) flash drive, a removable hard disk, a ROM, a RAM) a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method comprising:

obtaining a first audio frame comprising at least five channel signals;

pairing the at least five channel signals according to a first pairing manner to obtain a first channel pair set, wherein the first channel pair set comprises at least one channel pair, wherein one of the at least one channel pair comprises two channel signals of the at least five channel signals, wherein one of the at least one channel pair has one correlation value, and wherein the correlation value indicates a correlation between two channel signals of the channel pair;

obtaining a first sum of correlation values of the first channel pair set;

pairing the at least five channel signals according to a second pairing manner to obtain a second channel pair set;

obtaining a second sum of correlation values of the second channel pair set wherein a target pairing manner of the at least five channel signals is based on the first sum of correlation values and the second sum of correlation values, wherein the target pairing manner is the first pairing manner when the first sum of correlation values is greater than the second sum of correlation values, and wherein the target pairing manner is the second pairing manner when the first sum of correlation values is equal to the second sum of correlation values;

obtaining a fluctuation interval value of the at least five channel signals wherein an energy equalization mode is based on the fluctuation interval value when the target pairing manner is the first pairing manner or the second pairing manner;

separately performing energy equalization processing on the at least five channel signals according to the energy equalization mode to obtain at least five equalized channel signals; and encoding the at least five channel signals according to the target pairing manner.

2. The method of claim 1, wherein the energy equalization mode is a first energy equalization mode when the fluctuation interval value meets a preset condition, and wherein the energy equalization mode is a second energy equalization mode when the fluctuation interval value does not meet a preset condition.

3. The method of claim 2, wherein the target pairing manner is the first pairing manner, and that the energy equalization mode is a first energy equalization mode when the fluctuation interval value meets the preset condition, and wherein the target pairing manner is the second pairing manner and that the energy equalization mode is a second energy equalization mode when the fluctuation interval value does not meet a preset condition.

4. The method of claim 1, wherein the energy equalization mode is a second energy equalization mode when a coding bit rate corresponding to the first audio frame is greater than a bit rate threshold, and wherein the energy equalization mode is based on the fluctuation interval value when the coding bit rate is less than or equal to the bit rate threshold.

5. The method of claim 2, wherein the fluctuation interval value comprises:

an energy flatness of the first audio frame, and wherein the fluctuation interval value meeting the preset condition indicates that the energy flatness is less than a first threshold;

an amplitude flatness of the first audio frame, and wherein the fluctuation interval value meeting the preset condition indicates that the amplitude flatness is less than a second threshold;

an energy deviation of the first audio frame, and wherein the fluctuation interval value meeting the preset condition indicates that the energy deviation falls outside a first preset range; or an amplitude deviation of the first audio frame, and wherein the fluctuation interval value meeting the preset condition indicates that the amplitude deviation falls outside a second preset range.

6. The method of claim 1, wherein pairing the at least five channel signals according to a first pairing manner to obtain a first channel pair set comprises:

selecting a channel pair from channel pairs corresponding to the at least five channel signals; and adding the channel pair to the first channel pair set, to obtain a largest sum of correlation values.

7. The method of claim 1, wherein pairing the at least five channel signals according to a second pairing manner to obtain a second channel pair set comprises:

adding, to the second channel pair set, a channel pair with a largest correlation value in the channel pairs corresponding to the at least five channel signals; and adding, to the second channel pair set, a channel pair with a largest correlation value in other channel pairs other than an associated channel pair in the channel pairs corresponding to the at least five channel signals, wherein the associated channel pair comprises any channel signal comprised in a channel pair added to the first channel pair set.

8. The method of claim 1, wherein when the energy equalization mode is a first energy equalization mode, separately performing energy equalization processing on the at least five channel signals according to the energy equalization mode to obtain at least five equalized channel signals comprises:

calculating, for a current channel pair in a target channel pair set corresponding to the pairing manner, an average value of energy or amplitude values of two channel signals in the current channel pair; and separately performing energy equalization processing on the two channel signals based on the average value to obtain two corresponding equalized channel signals.

9. The method of claim 1, wherein when the energy equalization mode is a second energy equalization mode, separately performing energy equalization processing on the at least five channel signals according to the energy equalization mode to obtain at least five equalized channel signals comprises:

calculating an average value of energy or amplitude values of the at least five channel signals; and separately performing energy equalization processing on the at least five channel signals based on the average value to obtain the at least five equalized channel signals.

10. A coding apparatus, comprising:

at least one processor; and one or more memories coupled to the at least one processor and configured to store programming instructions for execution by the at least one processor to cause the coding apparatus to:

obtain a first audio frame comprising at least five channel signals;

pair the at least five channel signals according to a first pairing manner to obtain a first channel pair set, wherein the first channel pair set comprises at least one channel pair, wherein one channel pair of the at least one channel pair comprises two channel signals of the at least five channel signals, wherein one channel pair of the at least one channel pair has one correlation value, and wherein the correlation value indicates a correlation between two channel signals of the channel pair;

obtain a first sum of correlation values of the first channel pair set;

pair the at least five channel signals according to a second pairing manner to obtain a second channel pair set;

obtain a second sum of correlation values of the second channel pair set, wherein a target pairing manner of the at least five channel signals is based on the first sum of correlation values and the second sum of correlation values, wherein the target pairing manner is the first pairing manner when the first sum of correlation values is greater than the second sum of correlation values, and wherein the target pairing manner is the second pairing manner when the first sum of correlation values is equal to the second sum of correlation values;

obtain a fluctuation interval value of the at least five channel signals, wherein an energy equalization mode is based on the fluctuation interval value when the target pairing manner is the first pairing manner or the second pairing manner;

separately perform energy equalization processing on the at least five channel signals according to the energy equalization mode to obtain at least five equalized channel signals; and encode the at least five channel signals according to the target pairing manner.

11. The coding apparatus of claim 10, wherein the energy equalization mode is a first energy equalization mode when the fluctuation interval value meets a preset condition, and wherein the energy equalization mode is a second energy equalization mode when the fluctuation interval value does not meet a preset condition.

12. The coding apparatus of claim 11, wherein the target pairing manner is the first pairing manner, and the energy equalization mode is a first energy equalization mode when the fluctuation interval value meets the preset condition, and wherein the target pairing manner is the second pairing manner when the fluctuation interval value does not meet the preset condition, and the energy equalization mode is a second energy equalization mode.

13. The coding apparatus of claim 10, wherein the energy equalization mode is a second energy equalization mode when a coding bit rate corresponding to the first audio frame is greater than the bit rate threshold, and wherein the energy equalization mode is based on the fluctuation interval value when the coding bit rate is less than or equal to the bit rate threshold.

14. The coding apparatus of claim 11, wherein the fluctuation interval value comprises:

an energy flatness of the first audio frame, and wherein the fluctuation interval value meeting the preset condition indicates that the energy flatness is less than a first threshold;

amplitude flatness of the first audio frame, and wherein the fluctuation interval value meeting the preset condition indicates that the amplitude flatness is less than a second threshold;

an energy deviation of the first audio frame, and wherein the fluctuation interval value meeting the preset condition indicates that the energy deviation falls outside a first preset range; or an amplitude deviation of the first audio frame, and wherein the fluctuation interval value meeting the preset condition indicates that the amplitude deviation falls outside a second preset range.

15. The coding apparatus of claim 10, wherein the programming instructions further cause the coding apparatus to:

select a channel pair from channel pairs corresponding to the at least five channel signals; and add the channel pair to the first channel pair set to obtain a largest sum of correlation values.

16. The coding apparatus of claim 10, wherein the programming instructions further cause the coding apparatus to:

add, to the second channel pair set, a channel pair with a largest correlation value in the channel pairs corresponding to the at least five channel signals; and add, to the second channel pair set, a channel pair with a largest correlation value in other channel pairs other than an associated channel pair in the channel pairs corresponding to the at least five channel signals, wherein the associated channel pair comprises any channel signal comprised in a channel pair added to the first channel pair set.

17. The coding apparatus of claim 10, wherein when the energy equalization mode is a first energy equalization mode, the programming instructions further cause the coding apparatus to:

calculate, for a current channel pair in a target channel pair set corresponding to the pairing manner, an average value of energy or amplitude values of two channel signals comprised in the current channel pair; and separately perform energy equalization processing on the two channel signals based on the average value to obtain two corresponding equalized channel signals.

18. The coding apparatus of claim 10, wherein when the energy equalization mode is a second energy equalization mode, the programming instructions further cause the coding apparatus to:

calculate an average value of energy values or amplitude values of the at least five channel signals; and separately perform energy equalization processing on the at least five channel signals based on the average value to obtain the at least five equalized channel signals.

19. A computer program product comprising computer-executable instructions stored on a non-transitory computer-readable medium that, when executed by a processor, cause a coding apparatus to:

obtain a first audio frame comprising at least five channel signals;

pair the at least five channel signals according to a first pairing manner to obtain a first channel pair set, wherein the first channel pair set comprises at least one channel pair, wherein one channel pair of the at least one channel pair comprises two channel signals of the at least five channel signals, wherein one channel pair of the at least one channel pair has one correlation value, and wherein the correlation value indicates a correlation between two channel signals of the channel pair;

obtain a first sum of correlation values of the first channel pair set;

pair the at least five channel signals according to a second pairing manner to obtain a second channel pair set;

obtain a second sum of correlation values of the second channel pair set, wherein a target pairing manner of the at least five channel signals based on the first sum of correlation values and the second sum of correlation values, wherein the target pairing manner is the first pairing manner when the first sum of correlation values is greater than the second sum of correlation values, and wherein the target pairing manner is the second pairing manner when the first sum of correlation values is equal to the second sum of correlation values;

obtain a fluctuation interval value of the at least five channel signals, wherein an energy equalization mode is based on the fluctuation interval value when the target pairing manner is the first pairing manner or the second pairing manner;

separately perform energy equalization processing on the at least five channel signals according to the energy equalization mode to obtain at least five equalized channel signals; and encode the at least five channel signals according to the target pairing manner.

20. The computer program product of claim 19, wherein the energy equalization mode is a first energy equalization mode when the fluctuation interval value meets a preset condition, and wherein the energy equalization mode is a second energy equalization mode when the fluctuation interval value does not meet a preset condition.

21. The computer program product of claim 20, wherein the target pairing manner is the first pairing manner, and that the energy equalization mode is a first energy equalization mode when the fluctuation interval value meets the preset condition, and wherein the target pairing manner is the second pairing manner and that the energy equalization mode is a second energy equalization mode when the fluctuation interval value does not meet a preset condition.

* * * * *